United States Patent
Nagaya et al.

(10) Patent No.: US 8,366,355 B2
(45) Date of Patent: Feb. 5, 2013

(54) CUTTING INSERT AND CUTTING METHOD

(75) Inventors: Hidehiko Nagaya, Joso (JP); Norio Aso, Sashima-gun (JP); Yasuharu Imai, Shimotsuma (JP)

(73) Assignee: Mitsubishi Materials Corporation, Tokyo (JP)

( * ) Notice: Subject to any disclaimer, the term of this patent is extended or adjusted under 35 U.S.C. 154(b) by 448 days.

(21) Appl. No.: 12/450,912

(22) PCT Filed: Apr. 18, 2008

(86) PCT No.: PCT/JP2008/057585
§ 371 (c)(1),
(2), (4) Date: Oct. 19, 2009

(87) PCT Pub. No.: WO2008/133199
PCT Pub. Date: Nov. 6, 2008

(65) Prior Publication Data
US 2010/0119314 A1    May 13, 2010

(30) Foreign Application Priority Data
Apr. 20, 2007  (JP) ................................. 2007-111638

(51) Int. Cl.
*B23B 27/14*  (2006.01)
*B23B 27/04*  (2006.01)

(52) U.S. Cl. ......... 407/113; 407/114; 407/115; 407/117

(58) Field of Classification Search .................. 407/110, 407/113, 114, 115, 117
See application file for complete search history.

(56) References Cited

U.S. PATENT DOCUMENTS

| | | | |
|---|---|---|---|
| 4,778,311 A | 10/1988 | Niemi | |
| 5,975,812 A * | 11/1999 | Friedman | 407/114 |
| 6,238,147 B1 * | 5/2001 | Tagtstrom et al. | 407/117 |
| 6,715,968 B1 | 4/2004 | Tagtstrom et al. | |
| 6,742,971 B2 * | 6/2004 | Tong | 407/117 |

(Continued)

FOREIGN PATENT DOCUMENTS

| AT | 6205 U1 | 6/2003 |
|---|---|---|
| EP | 1405686 | 4/2004 |

(Continued)

OTHER PUBLICATIONS

International Search Report dated Jul. 1, 2008, issued on PCT/JP2008/057585.

(Continued)

*Primary Examiner* — Will Fridie, Jr.
(74) *Attorney, Agent, or Firm* — Edwards Wildman Palmer LLP

(57) ABSTRACT

A cutting insert, wherein: a cutting edge part having a quadrangular shaped cutting face, which is provided with a pair of side cutting edges extending in a longitudinal direction of an insert body, and a front cutting edge between ends of the side cutting edges that extends in a direction that intersects the longitudinal direction, is formed at an end of the insert body having a bar-shape; and viewed from a direction facing the cutting face perpendicularly to the longitudinal direction, at least one of a pair of corner edges where the side cutting edge and the front cutting edge intersect is formed in a convex shape such that it has a point of inflection at which, after a tangent line that makes contact with the corner edge rotates in a direction extending in the longitudinal direction along the corner edge from the front cutting edge, its direction of rotation changes, and it joins the side cutting edge.

7 Claims, 20 Drawing Sheets

U.S. PATENT DOCUMENTS

| | | | |
|---|---|---|---|
| 7,866,924 B2 * | 1/2011 | Nagaya et al. | 407/110 |
| 7,883,300 B1 * | 2/2011 | Simpson et al. | 407/115 |
| 2005/0180825 A1 | 8/2005 | Maier et al. | |
| 2005/0186040 A1 | 8/2005 | Gati | |
| 2008/0240875 A1 * | 10/2008 | Nagaya et al. | 407/113 |

FOREIGN PATENT DOCUMENTS

| | | |
|---|---|---|
| JP | 62-29204 | 2/1987 |
| JP | 01-121109 A | 5/1989 |
| JP | 08-071806 A | 3/1996 |
| JP | 10-058205 A | 3/1998 |
| JP | 10-113802 A | 5/1998 |
| JP | 11-129102 A | 5/1999 |
| JP | 2002-516185 | 6/2002 |
| JP | 2002-524272 | 8/2002 |
| JP | 2006-272509 A | 10/2006 |
| JP | 2007-069290 A | 3/2007 |
| WO | WO-96/08330 A1 | 3/1996 |

OTHER PUBLICATIONS

Supplementary European Search Report dated Mar. 10, 2011, issued for the corresponding Patent Application No. 08740640.1.

Notification (Information Statement) mailed Nov. 1, 2011, issued for the Japanese patent application No. 2009-511855.

Office Action mailed Oct. 2, 2012, issued for the Japanese Patent Application No. 2009-511855 and English translation thereof.

* cited by examiner

CUTTING INSERT AND CUTTING METHOD

TECHNICAL FIELD

The present invention relates to a cutting insert used for grooving and parting-off a workpiece during turning, and to a cutting method using this cutting insert. Priority is claimed on Japanese Patent Application No. 2007-111638, the contents of which are incorporated herein by reference.

BACKGROUND ART

For a cutting insert used for this type of grooving and parting-off, for example the following Patent Document 1 has proposed a cutting insert in which: corner cutting edges are included between each lateral cutting edge (side cutting edge) and the major cutting edge (front cutting edge); each corner cutting edge includes a primary curved cutting edge that extends from the major cutting edge; furthermore, a curved wiper cutting edge extends from the curved cutting edge to the lateral cutting edge; the curvature of the primary curved cutting edge has a smaller radius than that of the curved wiper cutting edge; and moreover, the lateral edges also have a smaller radius of curvature than the radius of curvature of the curved wiper cutting edge. Patent Document 1 states that it can produce an improved surface finish whereby subsequent finishing processing can be omitted.

Furthermore, cutting inserts are also disclosed in the following Patent Documents 2 to 4. Among them, for example Patent Document 4 proposes one that has an end cutting edge (front cutting edge) formed by the intersecting ridge of a cutting face and a front flank, side cutting edges, being intersecting ridges of the cutting face and side flanks, and arc shaped corner cutting edges, which are formed between the end cutting edge and the side cutting edges, wherein wiper cutting edges with a straight line shape are formed between the corner cutting edges and the side cutting edges, parallel to the longitudinal direction of the insert body, or such that they recede as they approach the side cutting edges at a shallower taper angle than that of the side cutting edges.

Patent Document 1: Published Japanese translation No. 2002-516185 of PCT International Publication
Patent Document 2: Japanese Unexamined Patent Application, First Publication No. H08-71806
Patent Document 3: Japanese Unexamined Patent Application, First Publication No. H10.58205
Patent Document 4: Japanese Unexamined Patent Application, First Publication No. 2006-272509

Problems to be Solved by the Invention

Incidentally, in the cutting inserts described in Patent Documents 1 to 4, the corner edges between the front cutting edge and the side cutting edges are formed such that they, including the wiper edges, curve outward and are angled from the front cutting edge to where they reach the side cutting edges, or recede toward the side cutting edges. That is, viewed from a direction facing the cutting face perpendicularly to the longitudinal direction of the insert body, they are formed such that after a tangent line that makes contact with each of the pair of corner edges rotates in a direction extending in the longitudinal direction along the primary curved cutting edge and the corner cutting edge along the corner edge from the front cutting edge, it continues to rotate in this direction, to make contact with the side cutting edge, and the corner edge including the wiper edge extends inside a line that extends toward the distal end side of the side cutting edge.

However, using such a cutting insert, the clearance from the machined surface formed in a workpiece becomes small in the region where a corner edge including the wiper edge reaches the side cutting edge. Therefore, on top of the tendency of the cutting resistance to increase, if abrasion progresses at the corner edge from the wiper edge toward the inside of the cutting face perpendicularly to the longitudinal direction, the length of the abrasion along the longitudinal direction increases significantly with respect to the amount of the abrasion. As a result, it causes a further increase in the cutting resistance, so that there is concern about the insert life being reduced. Moreover, if the insert body shifts toward either one of the pair of side cutting edges due to the increase in cutting resistance, since the clearance between the side cutting edge and the machined surface is also small on the corner edge side, there is also concern that the side cutting edge will dig into the machined surface, damaging the machining accuracy and quality.

On the other hand, in the grooving process using this cutting insert, the width of the groove that can be formed by feeding the insert body once in the longitudinal direction with respect to the workpiece becomes the maximum width of the cutting face in a direction perpendicular to the longitudinal direction. Therefore, if desired to form a groove of a width greater than the maximum width of the cutting face, a cutting method must be adopted in which, after the insert body that has been fed in the longitudinal direction is refracted once along the same longitudinal direction, the insert body is shifted in a direction intersecting this longitudinal direction and is again fed in the longitudinal direction. However in such a cutting method, time is taken in simply moving the cutting insert without performing cutting during the retraction of the insert body. Therefore a drop in machining efficiency cannot be avoided.

This is the same as, for example, a case of finish cutting a wide groove that is formed beforehand in the workpiece. That is, in such a case, the cutting method is such that the insert body is fed in the longitudinal direction along one wall surface of the groove to thereby finish cut the wall surface with the corner edge or the wiper edge. Then, after the front cutting edge has reached the bottom face of the groove, the insert body is fed in a direction that intersects the longitudinal direction to finish cut the bottom face. However, before this finish cutting of the bottom face reaches to the other wall surface of the groove, the insert body is retracted once, after which the insert body is fed along the other wall surface, to finish cut the other wall surface, and after the front cutting edge has again reached the bottom face of the groove, the insert body is fed in an opposite direction that intersects the longitudinal direction so that the entire bottom face is finished cut. Therefore, cutting is not performed while the insert body is being once retracted, with the result that cutting efficiency is impaired.

Moreover, in this cutting method, finish cutting of the bottom face of the groove is performed on either side of the process of retracting the insert body, in two processes of feeding the insert body in the two directions opposite to each other in a direction that intersects the longitudinal direction. Therefore, due to these two processes, a step or stripe is likely to occur on the joint of the machined surfaces, so that there is also a drop in the finish accuracy and quality of the machined surface.

The present invention has been made under such circumstances, with an object of providing a cutting insert that, in a cutting insert used for grooving or parting-off of a workpiece as described above, can prevent an extreme increase in cutting resistance due to abrasion at the corner edge, in order to extend the life of the insert, and can also ensure the clearance between the machined surface and the side cutting edge or the region where the corner edge reaches the side cutting edge, in order to improve the machining accuracy and quality.

Moreover, another object of the present invention is to provide a cutting method using this cutting insert, that is capable of forming a machined surface with high machining accuracy and machining quality, without impairing machining efficiency.

Means for Solving the Problem

In order to solve the above problems and achieve the objects, the present invention employs the following measures.

That is, in a cutting insert of the present invention, a cutting edge part having a quadrangular shaped cutting face, which is provided with a pair of side cutting edges extending in a longitudinal direction of an insert body, and a front cutting edge between ends of the side cutting edges that extends in a direction that intersects the longitudinal direction, is formed at an end of the insert body having a bar-shape; and viewed from a direction facing the cutting face perpendicularly to the longitudinal direction, at least one of a pair of corner edges where the side cutting edge and the front cutting edge intersect is formed in a convex shape such that it has a point of inflection at which, after a tangent line that makes contact with the corner edge rotates in a direction extending in the longitudinal direction along the corner edge from the front cutting edge, its direction of rotation changes, and it joins the side cutting edge.

According to the cutting insert, it is formed such that after a tangent line that makes contact with the corner edge rotates in a direction extending in the longitudinal direction of the insert body toward the side cutting edge along the corner edge from the front cutting edge, its direction of rotation changes at the point of inflection, and it rotates in the opposite direction to join the side cutting edge. Therefore, a part that is indented toward the inside of the cutting face is formed in a region where the corner edge reaches the side cutting edge.

That is, viewed from a direction facing the cutting face perpendicularly to the longitudinal direction, in the case where the side cutting edge extends toward the distal end side in a straight line for example, at least one of the pair of corner edges is formed in a convex shape that protrudes beyond a line extending toward the distal end side of the side cutting edge. Therefore, it is possible for the side cutting edge to recede significantly with respect to a corner edge formed in such a convex shape. Accordingly, it is also possible to ensure a large clearance between the machined surface formed by the corner edge and the side cutting edge. As a result, even if the insert body is shifted toward one of the side cutting edge sides, it is possible to prevent the side cutting edge from interfering with the machined surface of the workpiece, so that the accuracy and quality of the machined surface can be prevented from being damaged.

Furthermore, by forming the corner edge in such a convex shape, the increase in the length of abrasion in the longitudinal direction with respect to the amount of abrasion at the corner edge in a direction perpendicular to the longitudinal direction can also be kept small compared with the case where the corner edge curves outward and is angled such that its tangent line rotates in only one direction from the front cutting edge to the side cutting edge. As a result, it is also possible to prevent a significant increase in cutting resistance as the abrasion progresses. Therefore, it is possible to reduce the cutting resistance together with ensuring the clearance at the side cutting edge and the region where the corner edge reaches the side cutting edge as described above. As a result, it is possible to provide a cutting insert that is capable of stable machining over a long period, and that has a long life.

Here, when forming at least one of the pair of corner edges such that after a tangent line that makes contact with the corner edge rotates in a direction extending in the longitudinal direction along the corner edge from the front cutting edge, it changes its direction of rotation at the point of inflection in the region where the corner edge reaches the side cutting edge, viewed from a direction facing the cutting face perpendicularly to the longitudinal direction of the insert body, firstly, by forming at least one of the pair of corner edges in a concave-curved line shape from the point of inflection toward the side cutting edge, it is possible to ensure a larger clearance with the machined surface in the region from the point of inflection to the side cutting edge, and also to keep the increase in the length of abrasion at the corner edge lower with respect to the amount of abrasion.

In this case, the corner edge may be formed such that it joins smoothly before and after the point of inflection so that a tangent line that makes contact with the corner edge at the point of inflection changes its direction of rotation at the point of inflection continuously. Furthermore, the corner edge may intersect with angles before and after the point of inflection such that it curves outward and is angled so that this tangent line changes its direction of rotation at the point of inflection discontinuously. However, if a region that is curved outward and is angled by intersecting at an angle is left on the corner edge in this manner, chipping is likely to occur. Therefore, it is preferable for such a region to be joined for example by a convex-curved line such as a convex arc or the like, such that the join before and after it is smooth. In this case, the point of contact of the convex-curved line and the concave-curved line becomes the point of inflection.

Moreover, secondly, viewed from a direction facing the cutting face perpendicularly to the longitudinal direction, at least one of the pair of corner edges may be indented and angled at the point of inflection such that it intersects with angles before and after the point of inflection. In this case, the arrangement may also be such that after a tangent line that makes contact with the corner edge rotates in a direction extending in the longitudinal direction along the corner edge from the font cutting edge, it continues to rotate in this direction, so that the corner edge intersects the side cutting edge directly. Furthermore, after the tangent line rotates in this direction, the corner edge may intersect the side cutting edge via a straight line part or the like, which is angled such that it recedes toward the inside of the cutting face as the corner edge approaches the side cutting edge, for example.

Moreover, viewed from a direction facing the cutting face perpendicularly to the longitudinal direction, by providing, in at least one of the pair of corner edges, a wiper edge that extends in the longitudinal direction at a location where the tangent line rotates in a direction extending in the longitudinal direction, it is possible to smoothly finish a machined surface such as the wall surface of a groove formed in a workpiece by grooving, or the cut off surface of a workpiece cut off by parting-off. Therefore, the machining accuracy and the quality can be improved even more. The wiper edge may be one that bends in a convex shape with a large radius of curvature, such as the curved wiper cutting edge of the cutting insert disclosed in Patent Document 1. Furthermore, it may be a straight line shaped one that is parallel to the longitudinal direction of the insert body, or one that recedes as it approaches the side cutting edge in a shallow taper angle, such as the cutting inserts disclosed in Patent Documents 2 to 4.

Moreover, viewed from a direction facing the cutting face perpendicularly to the longitudinal direction, the front cutting edge may extend in a direction whereby it intersects the longitudinal direction diagonally. If the front cutting edge is made diagonal in this manner, it is possible to taper a core left in a workpiece from one cut off surface to the other cut off surface, especially when performing parting-off. As a result, it is possible to prevent a core from being left on this other cut off surface when the workpiece is cut off, so successive finish machining can be omitted or simplified. A cutting insert in this case is a so-called handed insert.

Viewed from a direction facing the cutting face perpendicularly to the longitudinal direction, a distance from an outermost point in the longitudinal direction of the front face cutting edge to the point of inflexion is preferably within a range of 10 to 60% with respect to a maximum width in a direction perpendicular to the longitudinal direction of the cutting face. If the distance is smaller than this range, the length in the longitudinal direction of the corner edge formed in a convex curve as described above becomes short, so that there is concern that failure is likely to occur in the corner edge when the clearance between the side cutting edge and the machined surface is great. On the other hand, if the distance is greater than this range, the length of the corner edge in the longitudinal direction becomes too long, with the possibility that the increase in the length of the abrasion in the longitudinal direction with respect to the aforementioned amount of the abrasion of the corner edge cannot be reliably suppressed.

As described above, according to the cutting insert of the present invention, the clearance between the machined surface of a workpiece and the region from the corner edge to the side cutting edge can be ensured, and it is also possible to prevent an increase in the length of the abrasion at the corner edge with respect to the amount of the abrasion. As a result, it is possible to assist smooth and stable grooving or parting-off, while preventing an increase in cutting resistance, in order to extend the insert life. Moreover, by ensuring clearance, even if the insert body shifts, it is possible to prevent the machined surface from being damaged, so that it is possible to improve the accuracy of the machined surface and its quality.

Incidentally, in the cutting insert of the present invention, the clearance between the machined surface of the workpiece and the region from the corner edge to the side cutting edge is ensured. Therefore when the cutting insert is fed in the longitudinal direction to perform a grooving or parting process, the side cutting edge is not involved in the cutting. This cutting edge is used for example after the insert body has cut into the workpiece in a range formed by the side cutting edge in the longitudinal direction, for performing cutting to widen the groove width by feeding the insert body in a direction intersecting the longitudinal direction.

Therefore, in the case where the abovementioned part that makes up the side cutting edge is not involved in cutting, the cutting insert of the present invention may be one where a cutting edge part having a cutting face, which is provided with a front cutting edge that extends in a direction that intersects a longitudinal direction of the insert body, is formed on an end of a bar shaped insert body; and viewed from a direction facing the cutting face perpendicularly to the longitudinal direction, a corner edge positioned on at least one end of two ends of the front cutting edge, is formed in a convex shape such that it has a point of inflexion at which, after a tangent line that makes contact with the corner edge rotates in a direction extending in the longitudinal direction along the corner edge from the front cutting edge, its direction of rotation changes.

In such a cutting insert, the part corresponding to the side cutting edge may be an edge ridge portion of a simple cutting face. For example, a chamfer may be applied to this edge ridge portion so that it is not used as a cutting edge. However, the abovementioned limit in the cutting insert of the present invention provided with the side cutting edge, can also be applied to a cutting insert in which the portion corresponding to the side cutting edge in this manner is made the edge ridge portion of the cutting edge. That is, the limit can be applied to a cutting insert in which a cutting edge part having a quadrangular shaped cutting face, which is provided with a pair of edge ridge portions extending in the longitudinal direction of the insert body, and a front cutting edge between the ends of the edge ridge portions that extends in a direction that intersects the longitudinal direction, is formed at the end of a bar shaped insert body; and viewed from a direction facing the cutting face perpendicularly to the longitudinal direction, at least one of the pair of corner edges where an edge ridge portion and the front cutting edge intersect is formed in a convex shape such that it has a point of inflection at which, after a tangent line that makes contact with the corner edge rotates in a direction extending in the longitudinal direction along the corner edge from the front cutting edge, its direction of rotation changes, and it joins the edge ridge portion.

That is to say, this cutting insert may be one where, viewed from a direction facing the cutting face perpendicularly to the longitudinal direction, the edge ridge portion extends toward a distal end side in a straight line, and at least one of the pair of corner edges is formed in a convex shape that protrudes beyond a line extending toward the distal end side of the side cutting edge.

The cutting insert may be one where, viewed from a direction facing the cutting face perpendicularly to the longitudinal direction, at least one of the pair of corner edges is formed in a concave-curved line shape from the point of inflection toward the edge ridge portion side.

The cutting insert may be one where, viewed from a direction facing the cutting face perpendicularly to the longitudinal direction, at least one of the pair of corner edges is indented and angled at the point of inflection.

The cutting insert may be one where, viewed from a direction facing the cutting face perpendicularly to the longitudinal direction, at least one of the pair of corner edges has a wiper edge that extends in the longitudinal direction.

The cutting insert may be one where, viewed from the direction facing the cutting face perpendicularly to the longitudinal direction, the distance from the outermost point in the longitudinal direction of the front face cutting edge to the point of inflexion is within a range of 10 to 60% with respect to a maximum width in the direction perpendicular to the longitudinal direction.

On the other hand, in the cutting insert constructed in the above manner, when viewed from a direction facing the cutting face perpendicularly to the longitudinal direction of the insert body as described above, the corner edge is formed in a convex shape having a point of inflexion, and on the part reaching to the ridge line portion of the corner edge, or on the part reaching to the side cutting edge, is formed a part that is concave-curved towards the inside of the cutting face. Therefore a cutting edge facing the opposite side to the front cutting edge side continuous with the point of inflexion is formed in the corner edge in this portion. Consequently, according to the cutting insert of the present invention, when the insert body is retracted in the longitudinal direction in sequence after cutting the workpiece by the part on the front face cutting edge side, of the front face cutting edge or the corner edge, cutting of the workpiece can be performed using the cutting part.

Therefore, the cutting method of the present invention, is a cutting method using a cutting insert having a construction in which: a cutting edge part having a cutting face, which is provided with a front cutting edge that extends in a direction that intersects a longitudinal direction of an insert body, is formed at the end of the insert body having a bar-shape; and viewed from a direction facing the cutting face perpendicularly to the longitudinal direction, a corner edge positioned on at least one end of two ends of the front cutting edge, is formed in a convex shape such that it has a point of inflection at which, after a tangent line that makes contact with the corner edge rotates in a direction extending in the longitudinal direction along the corner edge from the front cutting edge, its direction of rotation changes, wherein when the insert body that is fed in the longitudinal direction with respect to a workpiece is retracted in the longitudinal direction, a machined surface of the workpiece is cut by a cutting edge facing an opposite side to the front cutting edge side that is continuous with the point of inflection, of the corner edges.

For example in the direction perpendicular to the longitudinal direction of the insert body, in the case where it is desired to form a groove of a width that is greater than the maximum width of the cutting face, within a range of the protrusion amount of the corner edge that protrudes in a convex shape, the insert body that is fed in the longitudinal direction with respect to the workpiece to form the groove in the workpiece with the front cutting edge, is moved within the range of the protrusion amount to the side where the corner edge protrudes, and thereafter the insert body is retracted in the longitudinal direction. As a result, the wall surface (machined surface) of the previously formed groove can be cut continuously with the cutting part of the corner edge at the time of retraction.

Furthermore, for example in the case of finish cutting a wide groove formed beforehand in the workpiece, the cutting insert of the present invention having the convex shape corner edge on both ends of the front cutting edge is used. At first, the insert body is fed in the longitudinal direction along one wall surface of the groove to thereby finish cut the wall surface with the corner edge or wiper edge on the one wall side. Then after the front face cutting edge reaches the bottom face of the groove, the insert body is cross fed along the bottom face in a direction to intersect the longitudinal direction so that the bottom face is finish cut with the front cutting edge. When the corner edge on the other wall side reaches the other wall surface of the groove, the corner edge is cut into the other wall surface within the range of the protrusion amount, and the insert body is retracted as is, in the longitudinal direction. As a result, the other wall surface (machined surface) can be cut continuously.

Consequently, according to this cutting method, cutting can be formed continuously also at the time of retracting the insert body, and cutting can be performed in all of the processes while reciprocating the insert body in the longitudinal direction. Therefore intervention of a process that does not perform cutting while moving the insert body can be avoided as much as possible. As a result, it is possible to improve the work efficiency. Furthermore, in particular in the case where, as mentioned before, a wide groove formed beforehand in the workpiece is to be finish cut, this can be cut with a single cross feed without suspending the cutting step for the bottom face of the groove. Therefore steps or stripes are not formed in the finished groove bottom face so that it is also possible to improve the accuracy and finish of the machined surface.

Effects of the Invention

As described above, according to the cutting insert of the present invention, the clearance between the machined surface of a workpiece and the region from a corner edge to a side cutting edge or an edge ridge portion of a cutting edge that extends in the longitudinal direction of the insert body can be ensured, and it is also possible to prevent an increase in the length of the abrasion at the corner edge with respect to the amount of the abrasion. As a result, it is possible to assist smooth and stable grooving or parting-off, while preventing an increase in cutting resistance, in order to extend the insert life. Moreover, by ensuring clearance, even if an insert body shifts, it is possible to prevent the machined surface from being damaged, so that it is possible to improve the accuracy of the machined surface and its quality.

Furthermore, according to the cutting method of the present invention, by avoiding as much as possible the presence of a process in which cutting is not performed while moving the insert body, it is possible to assist efficient processing, and also particularly in the case of performing finishing of the groove formed in the workpiece, it is possible to improve the accuracy of the machined surface and the machining quality.

BRIEF DESCRIPTION OF THE REFERENCE SYMBOLS

Figure 1:
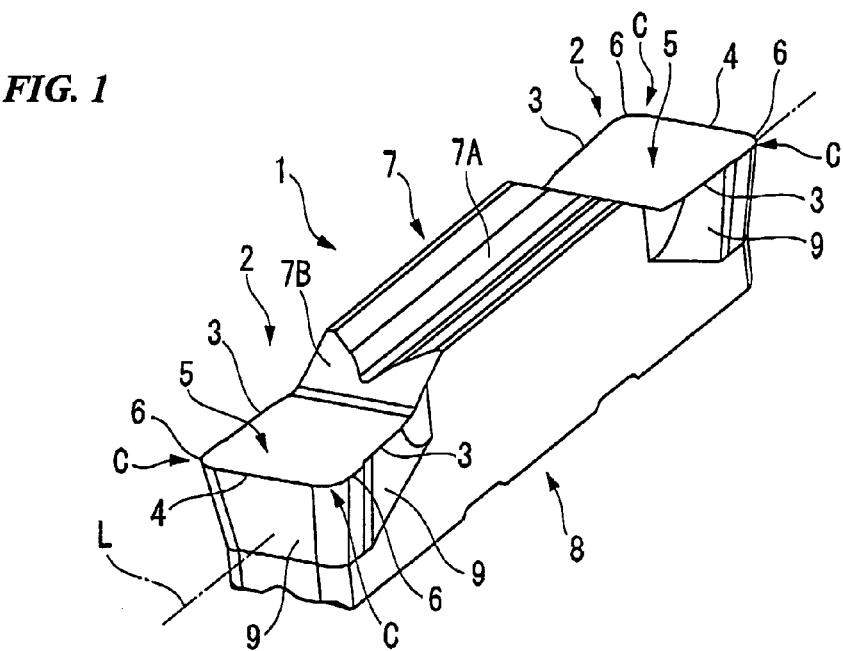
FIG. 1 is a perspective view showing a first embodiment of a cutting insert of the present invention.

1 Insert body
2 Cutting edge part
3 Side cutting edge
4 Front cutting edge
5 Cutting face
6 Corner edge
6A Convex-curved line edge
6B Wiper edge
6C Concave-curved line edge
6D Joining edge
6E Straight line edge
6F Chamfer
L Axis of insert body 1
O Point of inflection
W Workpiece
V Machined surface
H Rotation axis of workpiece W

BEST MODE FOR CARRYING OUT TEE INVENTION

FIG. 1 to FIG. 8 show a first embodiment of a cutting insert of the present invention. An insert body 1 of the present embodiment is formed from a hard material such as cemented carbide or the like, and is in an approximately rectangular bar shape (rectangular column shape) extending along an axis L; it is formed approximately symmetrically relative to a plane M perpendicular to the axis L, located in the center of the insert body 1 in the longitudinal direction (direction of the axis L, horizontal direction in FIG. 2 to FIG. 4); and is also formed in a shape symmetrical relative to a Eat plane N perpendicular to the flat plane M, located in the center in the widthwise direction (vertical direction in FIG. 2 and FIG. 4, horizontal direction in FIG. 5) of the insert body 1, and extending in the thickness direction (vertical direction in FIG. 3 and FIG. 5) of the insert body 1 containing the axis L.

Figure 2:
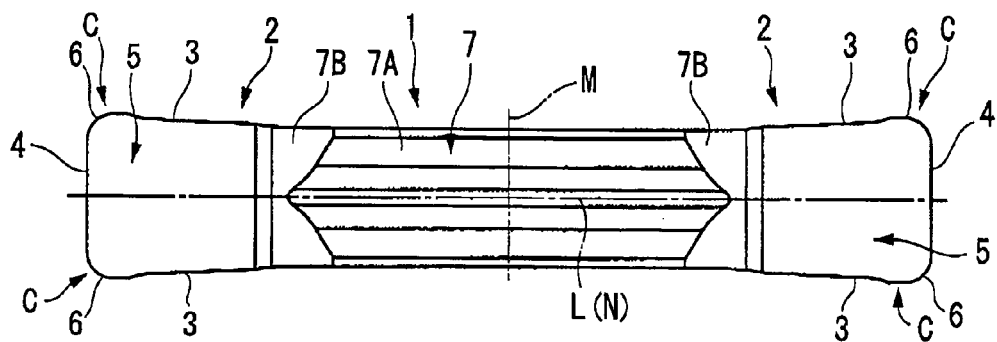
FIG. 2 is a plan view of the cutting insert viewed from a direction facing cutting faces 5, perpendicularly to the longitudinal direction.
Figure 6:
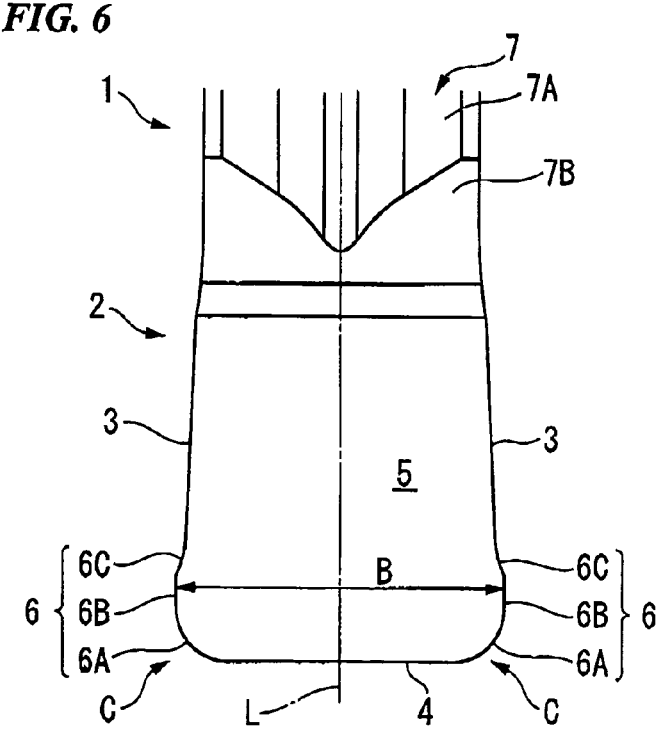
FIG. 6 is an enlarged plan view of a cutting edge part 2 of the cutting insert.

Cutting edge parts 2 are formed at the ends (both ends) of the insert body 1 in the longitudinal direction. A cutting face 5 is formed on the cutting edge part 2 such that it faces the thickness direction, and has a pair of side cutting edges 3 extending in the longitudinal direction, and a front cutting edge 4 extending between the ends of the side cutting edges 3 in the widthwise direction on its edge ridge portion. The cutting face 5 in the plan view seen from the direction facing the cutting face 5 in the thickness direction perpendicular to the longitudinal direction as shown in FIG. 2 and FIG. 6, has an approximately rectangular shape extending in the longitudinal direction. Corner edges 6 are formed at each of a pair of corners C where the side cutting edges 3 and the front cutting edge 4 intersect.

Figure 3:
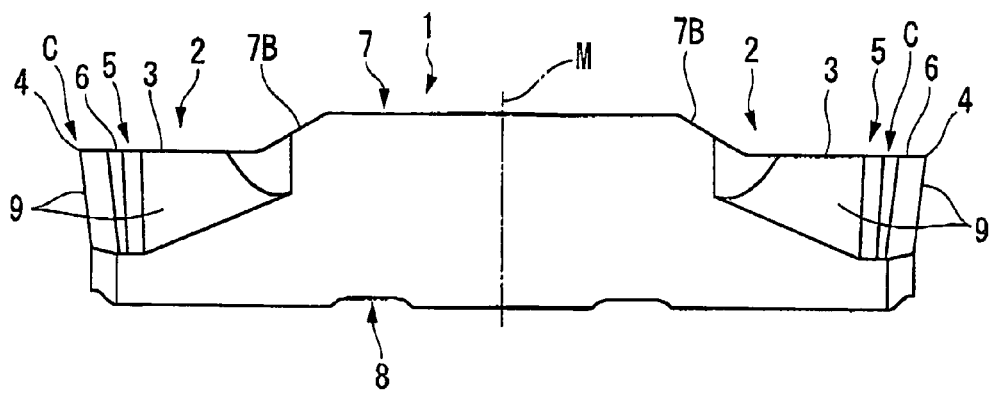
FIG. 3 is a side view of the cutting insert.
Figure 4:
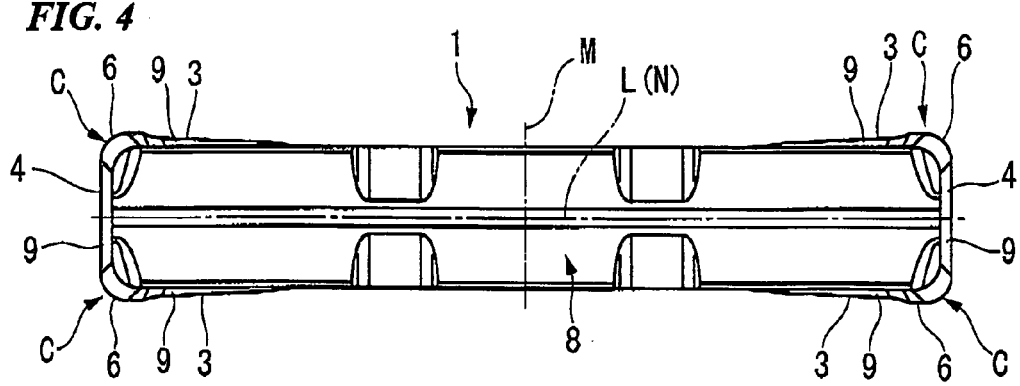
FIG. 4 is a bottom view of the cutting insert.
Figure 5:
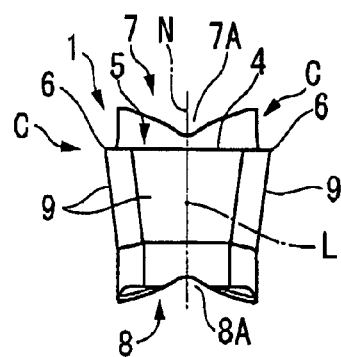
FIG. 5 is a front view of the cutting insert.

Between the cutting edge parts 2 at the two ends in the longitudinal direction, an upper surface part 7 of the insert body 1, which faces the same direction as the cutting faces 5 in the thickness direction, protrudes stepwise in the thickness direction above the cutting faces 5 of the cutting edge parts 2 as shown in FIG. 3. Furthermore, mounting groove parts 7A and 8A, which have concave V-shaped cross-sections over their whole length in the longitudinal direction, are formed in the upper surface part 7 and a lower surface part 8, which is opposite to the upper surface part 7, of the insert body 1. The mounting groove parts 7A and 8A make contact with and are gripped between a pair of facing jaw parts with a convex V-shaped cross-section in a detachable insert lathe tool holder, and thus the cutting insert is retained in this holder, and is used for grooving or parting-off of a workpiece. End faces 7B of the upper surface part 7, facing in the longitudinal direction, are inclined faces inclined towards the lower surface part 8 side as they approach the two cutting edge parts 2.

The end faces facing the longitudinal direction of the cutting edge part 2 and the two side faces facing the widthwise direction, are flanks 9 of the front cutting edge 4 and the pair of side cutting edges 3 respectively. The cutting insert of the present invention is a positive type insert in which the flanks 9 are inclined together with the intersecting ridge parts of the flanks 9 joined at the corners C, such that they gradually recede as they depart from the cutting faces 5 towards the lower surface part 8 side. The end faces and side faces of the insert body 1 excepting the flanks 9 of the cutting edge parts 2 are planes extending parallel to the thickness direction.

The cutting faces 5 are flat surfaces perpendicular to the thickness direction in the present embodiment. Therefore, the pair of side cutting edges 3, the front cutting edge 4, and the corner edges 6, are formed such that they extend in one plane perpendicular to the thickness direction as shown in FIG. 3. The pair of side cutting edges 3 are straight lines, and incline slightly with respect to the longitudinal direction such that they recede in the widthwise direction as they approach the rear end side of the cutting edge part 2 and converge with each other, and are provided with identical back tapers. Furthermore, the front cutting edge 4 is also straight and crosses at a right angle to the plane N in the present embodiment. Accordingly, in more detail, viewed relative to the pair of side cutting edges 3 and the front cutting edge 4, the cutting face exhibits an isosceles trapezoid shape having the front cutting edge 4 as its base (lower base) in the plan view.

On the other hand, each of the corner edges 6 comprises, in order, from the front cutting edge 4 towards the side cutting edges 3 at each of the corners C in the plan view as shown in FIG. 6 in the present embodiment: a convex-curved line edge 6A with a convex arc shape of approximately one fourth of a circle that merges smoothly with the straight front cutting edge 4; a wiper edge 6B that merges with the convex-curved line edge 6A and extends in a straight line in the longitudinal direction; and a concave-curved line edge 6C that intersects the wiper edge 6B at an angle, and recedes while making a concave arc towards the inside of the cutting face 5 in the widthwise direction as it approaches the rear end side (side cutting edge 3 side) to merge smoothly with the side cutting edge 3.

Here, the radius of curvature of the concave arc formed by the concave-curved line edge 6C is greater than the radius of curvature of the convex arc formed by the convex-curved line edge 6A.

By constructing in this manner, the corner edge 6 exhibits a convex shape such that it has a point of inflection O at which, after a tangent line that makes contact with the corner edge 6 rotates in a direction toward the longitudinal direction along the corner edge 6 from the cutting edge 4, its direction of rotation changes, and it joins the side cutting edge 3. That is, in the plan view as shown in FIG. 7, for example, in the case where the corner C on the right hand side is viewed with the front cutting edge 4 at the bottom, from a state in which a tangent line making contact with the corner edge 6 of the corner C makes contact with the front cutting edge 4 at the point of contact P of the corner edge 6 and the front cutting edge 4, as it approaches the wiper edge 6B along the convex-curved line edge 6A, it reaches the point of contact Q of the convex-curved line edge 6A and the wiper edge 6B while rotating toward the left (counterclockwise direction) in FIG. 7, and rotates toward the direction that extends in the longitudinal direction.

Furthermore, on the wiper edge 6B, a tangent line making contact with the corner edge 6 reaches a point of intersection R with the concave-curved line edge 6C, which intersects the wiper edge 6B at an angle, without rotating, and accordingly without changing its direction of rotation, parallel to the longitudinal direction (axis L direction) along the straight wiper edge 6B. In the present embodiment, the corner edge 6 protrudes the farthest outside in the widthwise direction at the wiper edge 6B. That is, the wiper edge 6B becomes the outermost point of the corner edge 6 in the widthwise direction.

Figure 7:
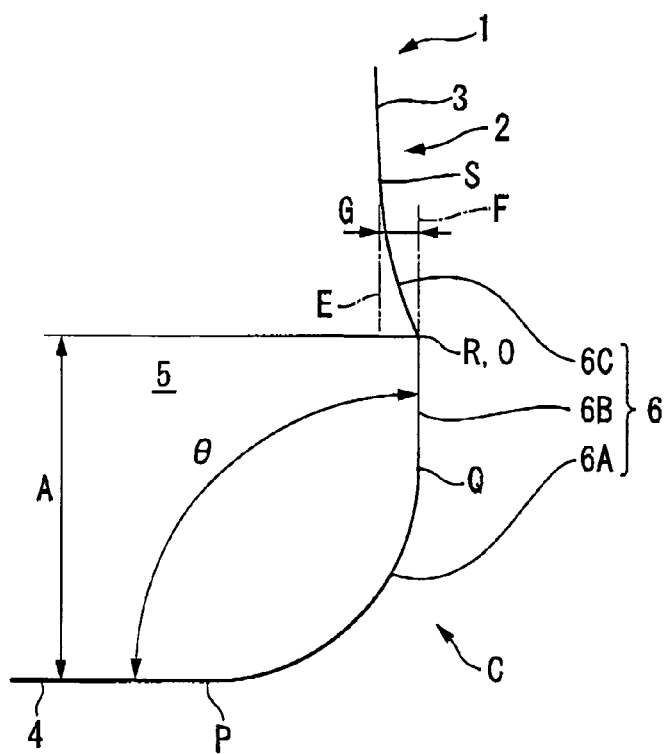
FIG. 7 shows the cutting insert, and is an enlarged plan view of a corner C at the bottom right side of FIG. 6.

At the point of intersection R, a tangent line of the corner edge 6 rotates along the wiper edge 6B from a direction that extends in the longitudinal direction to a tangent line of the concave-curved line edge 6C at the point of intersection R instantaneously, which is toward the left in FIG. 7, and at the same time, the direction of rotation changes from the point of intersection R toward the point of contact S of the concave-curved line edge 6C and the side cutting edge 3, such that a tangent line that makes contact with the concave-curved line edge 6C rotates toward the right (clockwise direction) in FIG.

7. Accordingly, in the present embodiment, a tangent line that makes contact with the corner edge 6 changes its direction of rotation at the point of intersection R, and the point of intersection R becomes a point of inflection O. Furthermore, a tangent line whose direction of rotation changes in this manner is angled slightly at the point of contact S, with respect to the longitudinal direction as described above, along the side cutting edge, which extends such that it recedes as it approaches the rear end side of the cutting edge part 2.

Figure 8:
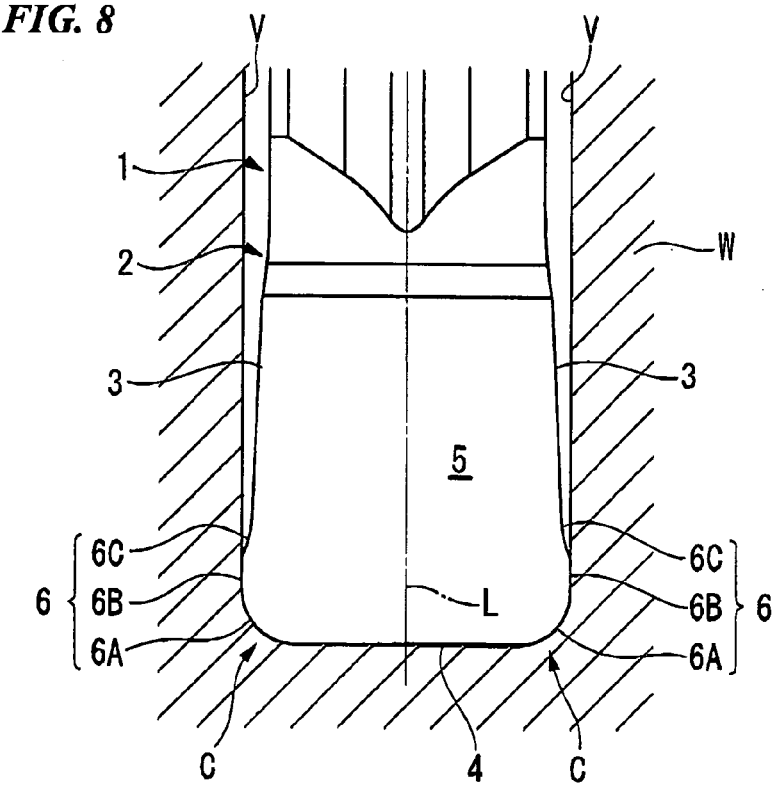
FIG. 8 is an enlarged plan view of the cutting edge part 2 when grooving or parting-off a workpiece W using the cutting insert.

In the cutting insert constructed in this manner, first of all, the wiper edge 6B, which extends in the longitudinal direction of the insert body 1, is formed at the part that protrudes the farthest in the widthwise direction of the corner edge 6. Therefore, in the case where such a cutting insert is retained in a holder as described above, and is fed in the longitudinal direction (axis L direction) to groove or part-off a workpiece, it is possible to finish a machined surface, which is a groove wall surface or a cut off surface formed in the workpiece W, smoothly such that it is parallel to the plane N along the longitudinal direction as shown in FIG. 8.

Moreover, in the cutting insert with the above construction, a tangent line that makes contact with the corner edge 6 changes its direction of rotation where the point of intersection R with the concave-curved line edge 6C, which is at the rear end of the wiper edge 6B, is the point of inflection O. Consequently, a concave-curved part that is indented instantaneously toward the inside of the cutting face 5 with respect to the wiper edge 6B, which protrudes the farthest in the widthwise direction, and joins the side cutting edge 3, is formed in the corner edge 6 in a region of the concave-curved line edge 6C running from the point of inflection O (point of intersection R) to the side cutting edge 3. In other words, in the case where the side cutting edge 3 extends in a straight line as in the present embodiment, since the corner edge 6 is formed such that it protrudes in the widthwise direction with respect to a line extending toward the distal end side of the side cutting edge 3, it is possible to ensure the clearance of the side cutting edge 3 with respect to the machined surface of the workpiece W formed by the wiper edge 6B as shown in FIG. 8.

Therefore, according to such a cutting insert, when the insert body 1 is fed in the longitudinal direction (axis L direction) to perform grooving or parting-off as described above, it is possible to reliably prevent the side cutting edges 3 and the flank 9 that joins them from making contact with the machined surface V. As a result, it is possible to reduce the cutting resistance during processing, to assist smooth and stable processing. Furthermore, by ensuring a large clearance between the side cutting edge 3 and the machined surface V, even if the insert body 1 is shifted such that it inclines toward either one of the side cutting edge 3 sides in FIG. 8 due to an excessive cutting load acting on it for example, it is possible to avoid a situation in which the side cutting edge 3 interferes with the machined surface V and damages it. Accordingly, it is also possible to prevent the accuracy and quality of the machined surface V from being impaired.

Moreover, by the corner edge 6 being formed in a convex shape as described above, even if abrasion (abrasion of the flanks 9) occurs on the wiper edge 6B of the corner edge 6 along the longitudinal direction, progressing toward the inside of the cutting face 5 in the widthwise direction, the abrasion does not reach the side cutting edge 3 in the region where the corner edge 6 protrudes beyond the above-mentioned extending line. Therefore, it is possible to prevent the length of the abrasion in the longitudinal direction from increasing suddenly and significantly. That is, it is possible to keep the increase in the length of the abrasion in the longitudinal direction low with respect to the amount of abrasion in the widthwise direction in this region, and it is also possible to prevent an increase in the cutting resistance due to the increase in the length of abrasion. As a result, according to the cutting insert with the above described construction, it is possible to maintain the cutting resistance at its initial low level over a long period. Accordingly, it is possible to provide along life cutting insert by which smooth and stable grooving and parting-off are also possible over a long period.

In particular, in the present embodiment, a concave-curved part that is indented instantaneously toward the inside of the cutting face 5 with respect to the wiper edge 6B, and joins the side cutting edge 3, is a concave-curved line edge 6C, which is formed in a concave-curved line (concave arc) shape toward the side cutting edge 3 side from the point of inflection O, where the point of intersection R with this wiper edge 6B is the point of inflection O. For example, compared with the case where the point of intersection R and the point of contact S with the side cutting edge 3 are connected by a straight line as in a second embodiment to be described later, for example, the indentation of the concave part toward the inside of the cutting face 3 can also be larger. That is, the clearance can be ensured even more. Moreover, since the increase in the length of abrasion of the wiper edge 6B in the longitudinal direction with respect to the amount of abrasion in the widthwise direction can be kept lower, it is possible for the effect described above to be realized more reliably.

In the plan view as shown in FIG. 7, the distance A in the longitudinal direction from the front cutting edge 4 to the point of inflection O is preferable within a range of 10 to 60% with respect to a maximum width B (in this embodiment, the distance between the wiper edges 6B of the pair of corner edges 6) in the direction perpendicular to the longitudinal direction of the cutting face 5 shown in FIG. 6. If this distance A is smaller than the abovementioned range, the concave shape corner edges 6 themselves becomes short in the longitudinal direction with the possibility that failure is likely to occur. On the other hand, if this distance A becomes greater than the range, the corner edges 6 become too long in the longitudinal direction, with the possibility that the increase in the length of the abrasion in the longitudinal direction with respect to the amount of the abrasion cannot be suppressed.

Furthermore, in the plan view as shown in FIG. 7, in the case where the side cutting edge 3 is a straight line, then preferably the protrusion amount G in the width direction of the corner edge 6 from the extension line E (the distance between the extension line E in the plan view and the straight line F that circumscribes the corner edge 6 in parallel with the extension line E) is within a range of 3 to 25% with respect to the maximum width B. If greater than this, the corner edge 6 protrudes too much, with the possibility that eventually a failure is likely to occur, while if smaller than this, there is the possibility that the clearance between the side cutting edge 3 and the machined surface V cannot be ensured.

In the present embodiment, the wiper edge 6B is formed as a straight line, which is parallel to the axis L and along the longitudinal direction in the plan view. That is, the wiper edge 6B extends in a direction which intersects the front cutting edge 4, which is perpendicular to the longitudinal direction in the present embodiment, at an intersection angle θ of 90° as shown in FIG. 7. However, similarly to the above-described Patent Document 2 for example, the intersection angle θ may be set such that it is inclined toward the inside of the cutting face 5 in the widthwise direction as it approaches the rear end side of the cutting edge part 2. In this case, the point of contact or the point of intersection of the inclined wiper edge 6B and the convex-curved line edge 6A becomes the outermost point of the corner edge 6 in the widthwise direction. However, if the intersection angle θ becomes too small, there is concern that the machined surface V cannot be finished smoothly as with the wiper edge 6B as described above. Therefore, it is preferable to set the intersection angle θ in a range of 88° or greater, for example, so as to apply a smaller back taper than the back taper applied to the side cutting edge 3.

Figure 9:
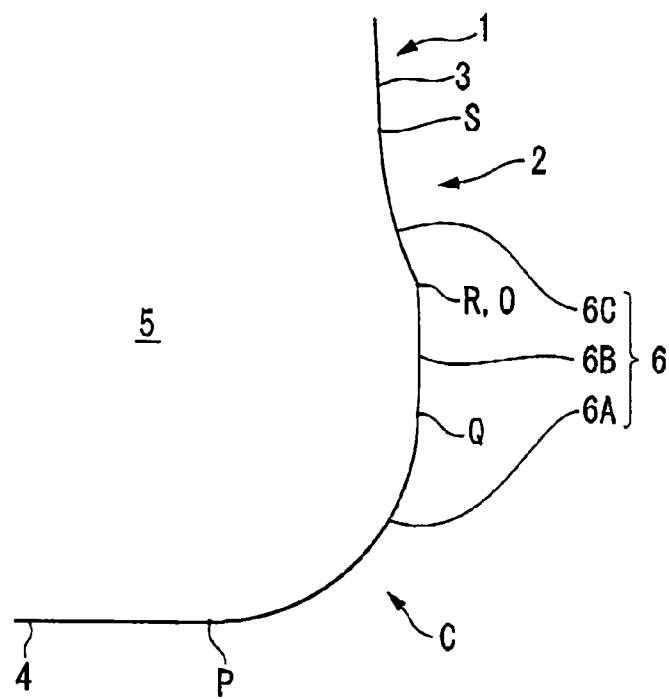
FIG. 9 is a diagram showing a first modified example of the cutting insert, corresponding to an enlarged plan view of the corner C at the bottom right of FIG. 6.

Furthermore, instead of forming the wiper edge 6B as a straight line in this manner, as in a first modified example of the first embodiment as shown in FIG. 9, the wiper edge 6B may be formed as a convex-curved line shape such as a convex arc with a large radius of curvature, which protrudes toward the outside of the cutting face 5 in the widthwise direction in the plan view. Regarding other modified examples, and other embodiments and their modified examples, which are described hereunder, beginning with the first modified example, the same symbols are used for the elements that are common with the first embodiment, and their descriptions are omitted.

In the first modified example, in the plan view, the convex-curved line formed by the wiper edge 6B has a larger radius of curvature than that of the convex-curved line (convex arc) formed by the convex-curved line edge 6A and the concave-curved line (concave arc) formed by the concave-curved line edge 6C of the corner edge 6, and is formed such that it makes contact with the convex-curved line edge 6A at the point of contact Q. The straight line (that is, a chord of the convex-curved line shape of the wiper edge 6B) that connects the point of contact Q and the point of intersection R with the concave-curved line edge 6C, which is the point of inflection O, is set to be within the region of the intersection angle θ. Accordingly, a tangent line that makes contact with the corner edge 6 also rotates to the left from the point of contact Q up to the point of intersection R in FIG. 9, changes its direction at the point of intersection R, which is the point of inflection O, and becomes parallel to the longitudinal direction (axis L direction) at one point on the wiper edge 6B, so this one point becomes the outermost point of the corner edge 6 in the widthwise direction.

Figure 10:
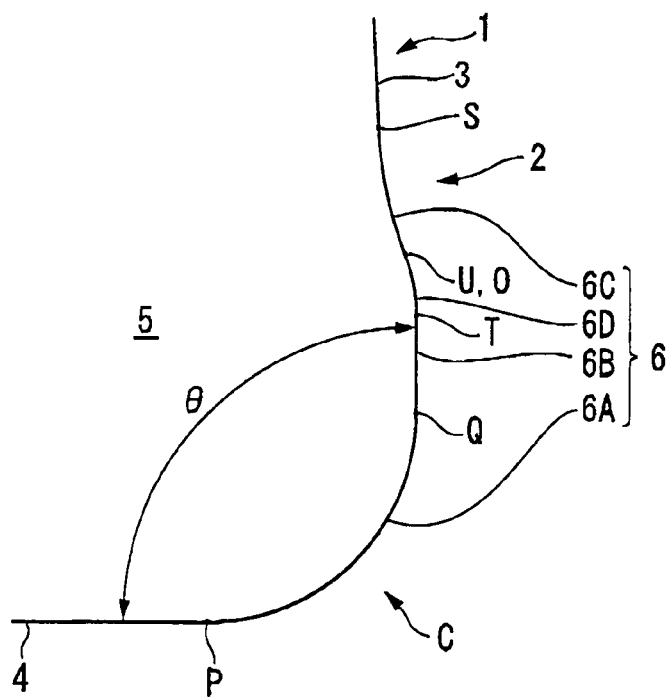
FIG. 10 is a diagram showing a second modified example of the cutting insert, corresponding to an enlarged plan view of the corner C at the bottom right of FIG. 6.
Figure 11:
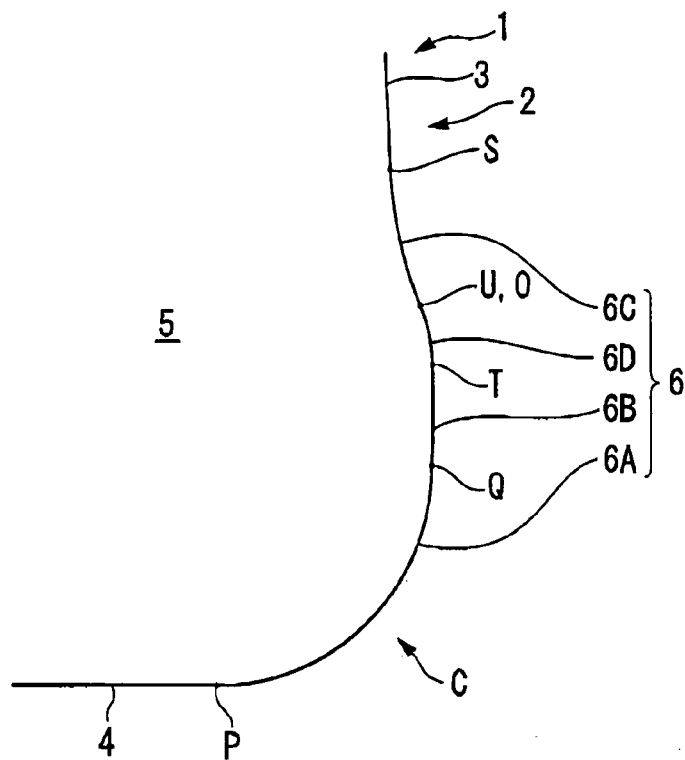
FIG. 11 is a diagram showing a third modified example of the cutting insert, corresponding to an enlarged plan view of the corner C at the bottom right of FIG. 6.

Moreover, as in the first embodiment and the first modified example, if the wiper edge 6B and the concave-curved line edge 6C of the corner edge 6 are formed such that they intersect at an angle at the point of intersection R, there is concern that chipping is likely to occur in the corner edge 6 around the point of intersection R. Therefore, in such a case, as in a second modified example and a third modified example of the first embodiment as shown in FIG. 10 and FIG. 11, the arrangement may be such that the vicinity of the point of intersection R is joined smoothly by a joining edge 6D with a convex-curved line shape such as a convex arc or the like to prevent a sharp angle part, which is easy to chip, from being left.

In this case, the joining edge 6D makes contact with the wiper edge 6B and the concave-curved line edge 6C at points of contact T and U respectively. Accordingly, the point of contact U where the convex-curve line shaped joining edge 6D and the concave-curve line shaped concave-curved line edge 6C meet becomes the point of inflection O. Furthermore, a tangent line that makes contact with the corner edge 6 changes its direction of rotation continuously before and after the point of inflection O from a left handed rotation to a right handed rotation in FIG. 10 and FIG. 11 toward the side cutting edge 3 side. FIG. 10 is a modified example of the first embodiment, where the wiper edge 6B is formed as a straight line shape, and FIG. 11 is a further modified example of the first modified example, where the wiper edge 6B is formed as a convex-curved line shape.

Figure 12:
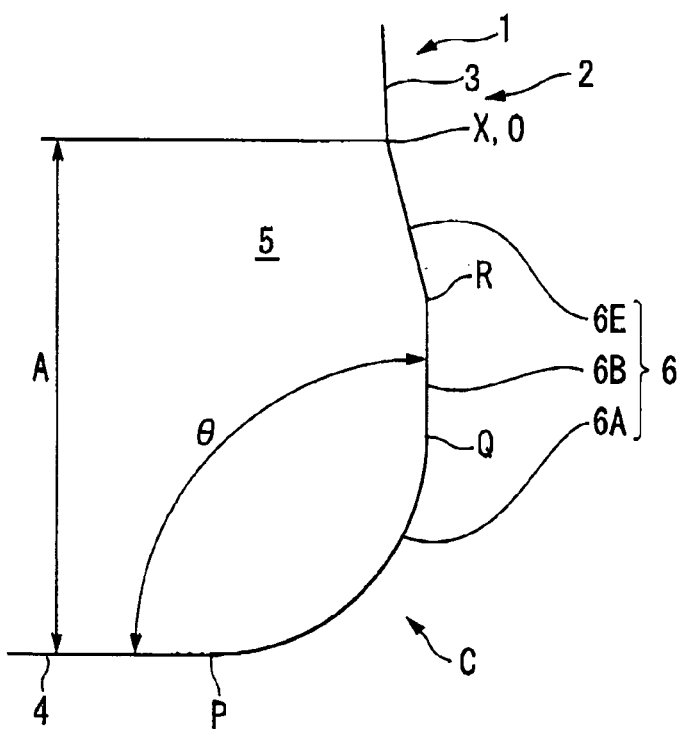
FIG. 12 is a diagram showing a second embodiment of a cutting insert of the present invention, corresponding to an enlarged plan view of the corner C at the bottom right of FIG. 6.

FIG. 12 shows a second embodiment of the present invention. That is, in the first embodiment and its modified examples, by forming the concave-curved line edge 6C as a concave-curved line shape in the plan view between the wiper edge 6B and the side cutting edge 3 of the corner edge 6, the direction of rotation of a tangent line that makes contact with the corner edge 6 can be changed to have, as its point of inflection, a point of intersection R of the wiper edge 6B and the concave-curved line edge 6C, or a point of contact U of the joining edge 6D formed in the point of intersection R region and the concave-curved line edge 6C. However, the second embodiment is characterized in that a region from the rear end of the wiper edge 6B to the side cutting edge 3 of the corner edge 6, in the plan view, is a straight line edge 6E that is angled at a greater angle than that of the back taper applied to the side cutting edge 3 toward the inside of the cutting face 5 in the widthwise direction as it approaches the side cutting edge 3 side and recedes in a straight line shape, and the straight line edge 6E intersects the side cutting edge 3 at a point of intersection X, and is indented and angled such that it is indented toward the inside of the cutting face 5, and the point of intersection X is made the point of inflection O. Consequently, in this case the distance A in the longitudinal direction from the front cutting edge 4 to the point of inflection O becomes the distance to the intersection point X as shown in FIG. 12.

To be specific, in a corner C of the second embodiment shown in FIG. 12, a tangent line that makes contact with the corner edge 6 rotates to the left in FIG. 12, similarly to the first embodiment, until it passes through the points of contact P and Q as it approaches the side cutting edge 3 side from the front cutting edge 4 side along the corner edge 6, and reaches the point of intersection R with the straight line edge 6E at the rear end of the wiper edge 6. However, in the first embodiment, after this tangent line has a great instantaneous rotation when it moves onto the concave-curved line edge 6C at the point of intersection R (point of inflection O), the direction of rotation changes and it rotates to the right along the concave-curved line edge 6C. On the other hand, in the second embodiment, a tangent line that makes contact with the corner edge 6 extends from the point of intersection R to the point of intersection X of the straight line edge 6E and the side cutting edge 3 along the straight line edge 6E without rotating, accordingly without changing its direction of rotation, and changes its direction of rotation when it rotates to the right at the point of intersection X so as to go along the side cutting edge 3, and the point of intersection X becomes the point of inflection O.

Accordingly, in the second embodiment also, the corner edge 6 is formed such that it is indented at the point of intersection X, which is the point of inflection O, toward the inside of the cutting face 5 in the widthwise direction in the plan view. In other words, since the corner edge 6 is formed to be a convex shape such that it protrudes with respect to the line extending to the distal end side of the side cutting edge 3 in the widthwise direction, similarly to the first embodiment, it is possible to ensure clearance between the side cutting edge 3 and the machined surface V, and also it is possible to keep the length of the abrasion in the longitudinal direction of the wiper edge 6B of the corner edge 6 low with respect to the amount of abrasion in the widthwise direction. Furthermore, in the present embodiment, since the part between the points of intersection R and X is formed as a straight line edge 6E, and the part of the flank 9 that joins the straight line edge 6E is formed as a plane only, compared with the first embodiment in which the part of the flank 9 that joins the concave-curved line edge 6C must be formed in a concave-curved shape, an advantage can also be obtained in that the formation of the cutting edge part 2 is comparatively easy.

Figure 13:
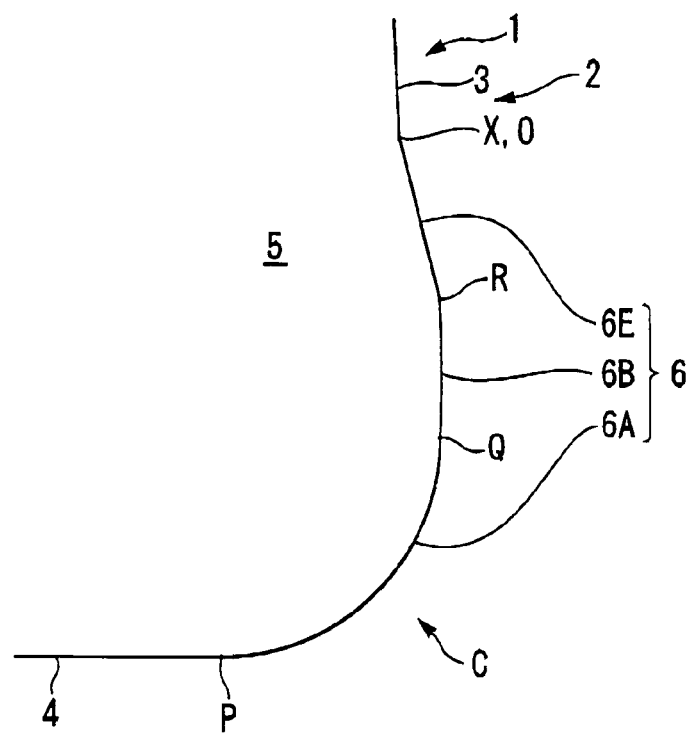
FIG. 13 is a diagram showing a first modified example of the cutting insert, corresponding to an enlarged plan view of the corner C at the bottom right of FIG. 6.
Figure 14:
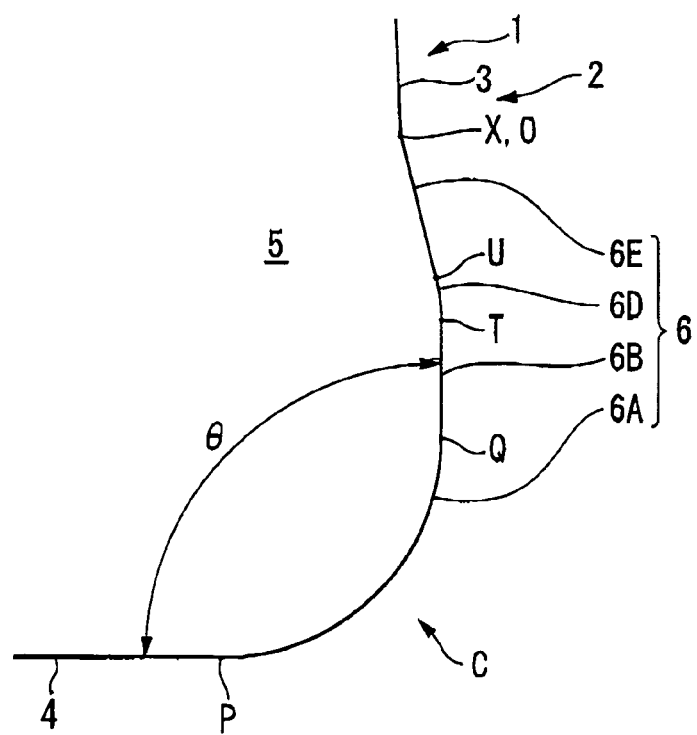
FIG. 14 is a diagram showing a second modified example of the cutting insert, corresponding to an enlarged plan view of the corner C at the bottom right of FIG. 6.
Figure 15:
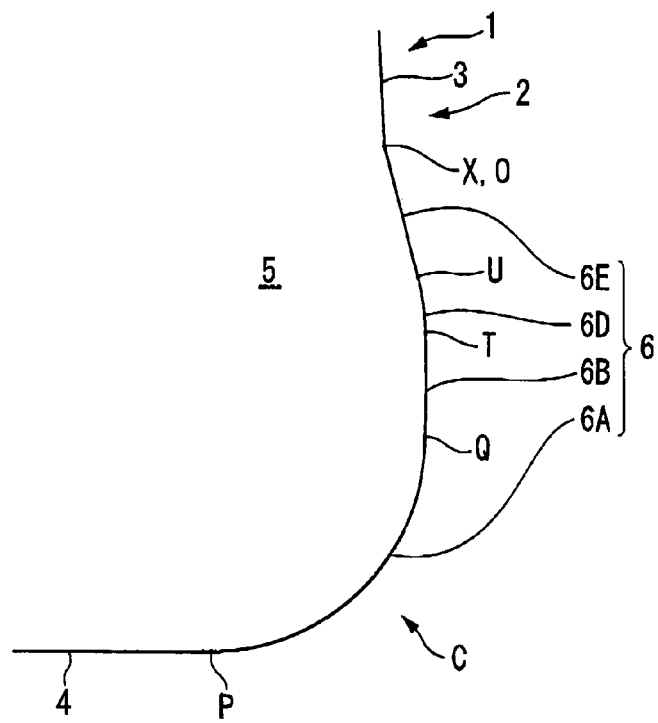
FIG. 15 is a diagram showing a third modified example of the cutting insert, corresponding to an enlarged plan view of the corner C at the bottom right of FIG. 6.

FIG. 13 to FIG. 15 show first to third modified examples of the second embodiment. FIG. 13 shows a first modified example in which the wiper edge 6B is a convex-curved line shape with a large radius of curvature in the plan view similarly to the first modified example of the first embodiment as shown in FIG. 9. FIG. 14 shows a second modified example in which, similarly to the second modified example of the first embodiment as shown in FIG. 10, the vicinity of a point of intersection R where a wiper edge 6B and a straight line edge 6E intersect at an angle is joined smoothly by a convex-curved line joining edge 6D, which makes contact with the wiper edge 6B and the straight line edge 6E at points of contact T and U. FIG. 15 shows a third modified example in which, similarly to the third modified example of the first embodiment as shown in FIG. 11, the wiper edge 6B is a convex-curved line, and also the vicinity of the point of intersection R is joined by a joining edge 6D. However, in the second and third modified examples of the second embodiment, as in the second and third modified examples of the first embodiment, the direction of rotation of a tangent line that makes contact with the corner edge 6 does not change at the point of contact U, and the point of inflection O remains the point of intersection X.

Figure 16:
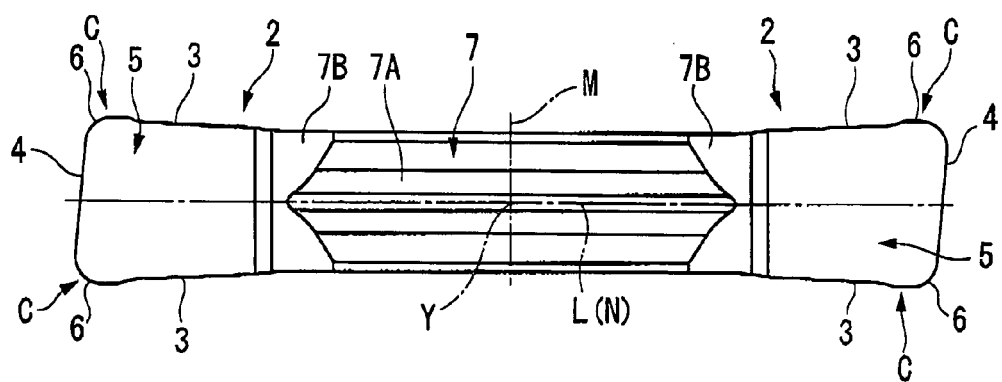
FIG. 16 is a diagram showing a third embodiment of the cutting insert of the present invention, and is a plan view from a direction facing cutting faces 5, perpendicular to the longitudinal direction.
Figure 17:
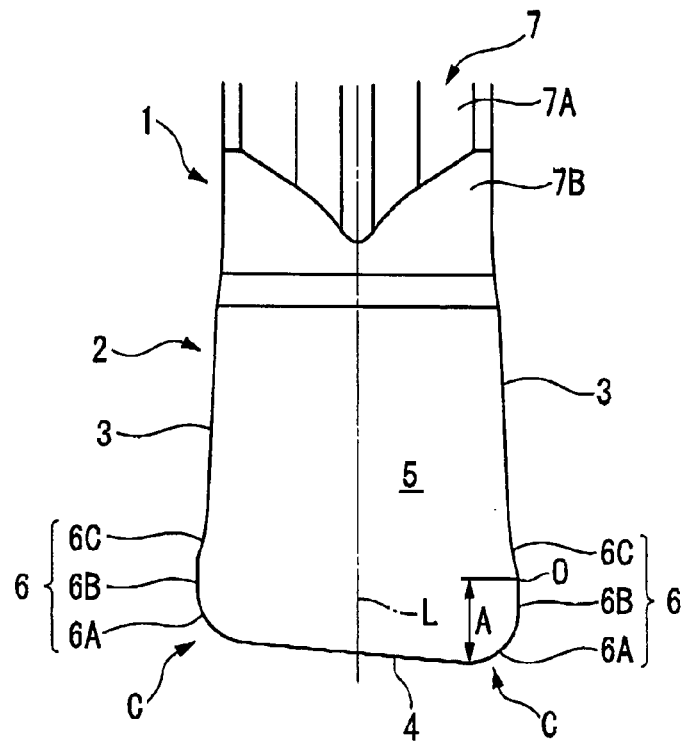
FIG. 17 is an enlarged plan view of a cutting edge part 2 of the cutting insert.
Figure 18:
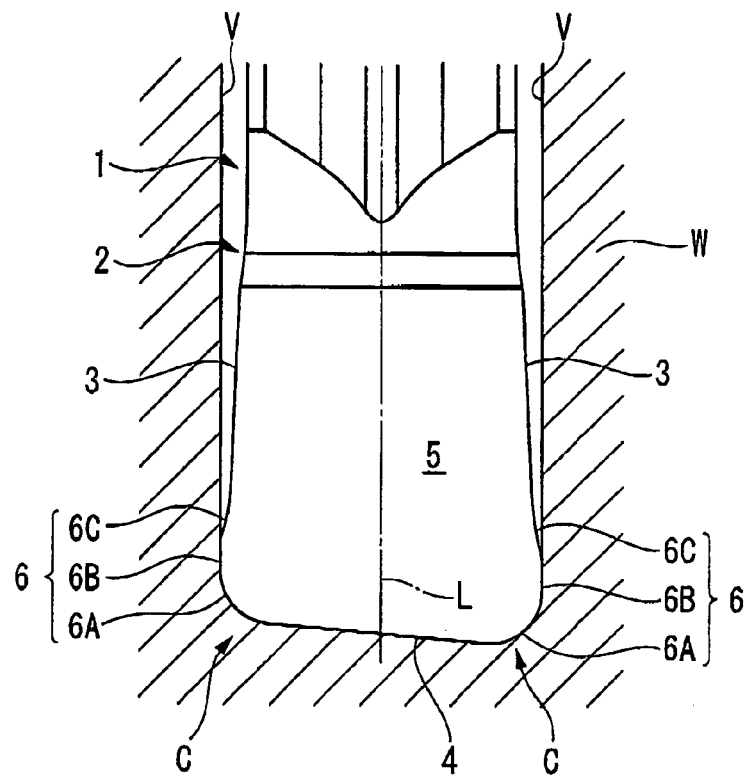
FIG. 18 is an enlarged plan view of the cutting edge part 2 when grooving or parting-off a workpiece W using the cutting insert.

Next, FIG. 16 to FIG. 18 show a third embodiment of the present invention. That is, in the first and the second embodiments and their modified examples, the front cutting edge 4 extends in a direction whereby it crosses at a right angle to the insert body 1 in the longitudinal direction (axis L direction). However, the third embodiment is characterized in that the front cutting edge 4 is formed such that it extends in a direction whereby it crosses diagonally to the insert body 1 in the longitudinal direction (axis L direction) in the plan view. In the third embodiment, the construction of the first embodiment is used for the parts excepting the front cutting edge 4. However, needless to say, it is possible to use the constructions of the second embodiment, and the first to the third modified examples of the first and the second embodiments. Furthermore, the distance A in this case, as shown in FIG. 17, may be made a distance from the outermost point in the longitudinal direction of the inclined cutting edge 4 to the point of inflection O.

According to the cutting insert of the third embodiment, especially when used for parting-off a rotating workpiece W, when the axis L of the insert body 1 is located on a plane perpendicular to the axis of rotation of the workpiece W, and it is fed in the axis L direction, the bottom face of a groove formed in the workpiece W by the cutting edge part 2 also crosses the axis L diagonally, and also becomes diagonal with respect to the axis of rotation of the workpiece W as shown in FIG. 18. As the insert body 1 continues to be fed, the workpiece W is cut first at the corner C on the side (right hand side of FIG. 18) where the front cutting edge 4 protrudes at the distal end side in the longitudinal direction. Moreover, on the opposite side (left hand side of FIG. 18) of the corner C where the front cutting edge 4 recedes, a tapered conical shaped core is left on the machined surface V of the workpiece W along the axis of rotation.

However, as in the first and the second embodiments and their modified examples, if the front cutting edge 4 is perpendicular to the longitudinal direction, the bottom face of the groove becomes perpendicular to the longitudinal direction, that is, parallel to the axis of rotation of the workpiece W. Accordingly, immediately before the workpiece W is cut off, a cylindrical core with a constant diameter along the axis of rotation remains. However, there is concern that such a core breaks and is cut in its central part before being machined off completely, and remains on the two machined surfaces V of the workpiece W. In such a case, finish machining must be applied to the two machined surfaces V to remove the remaining cores. However, in the third embodiment, a core is only left on the machined surface V on the corner C side where the front cutting edge 4 recedes as described above. As a result, it is possible to reduce the time and labor required for the finish machining, to a half.

Figure 19:
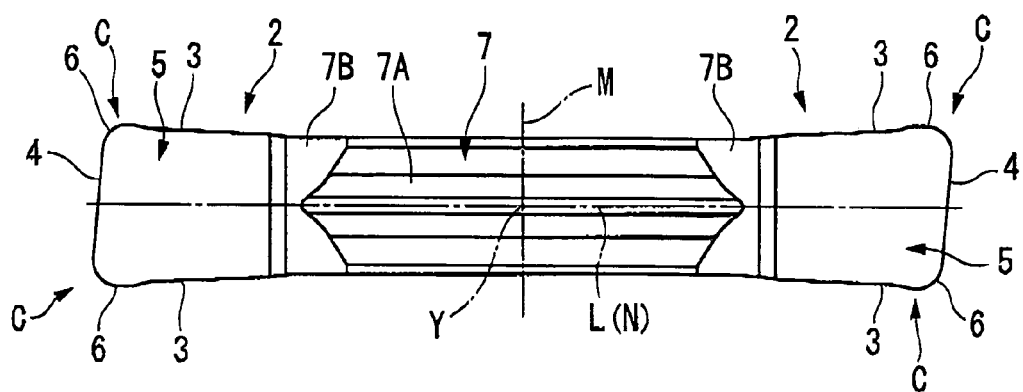
FIG. 19 is a plan view showing a modified example of the cutting insert.
Figure 20:
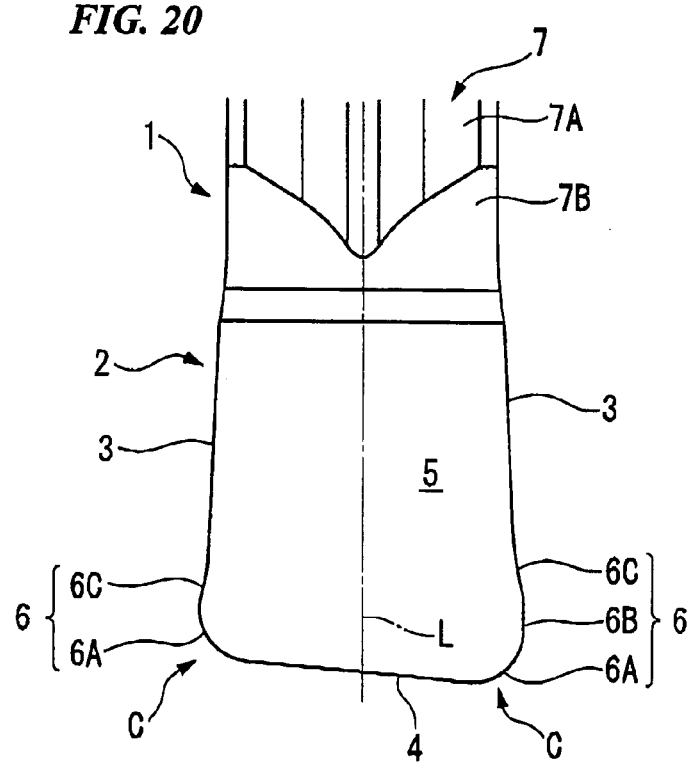
FIG. 20 is an enlarged plan view of the cutting edge part 2 of the modified example.
Figure 21:
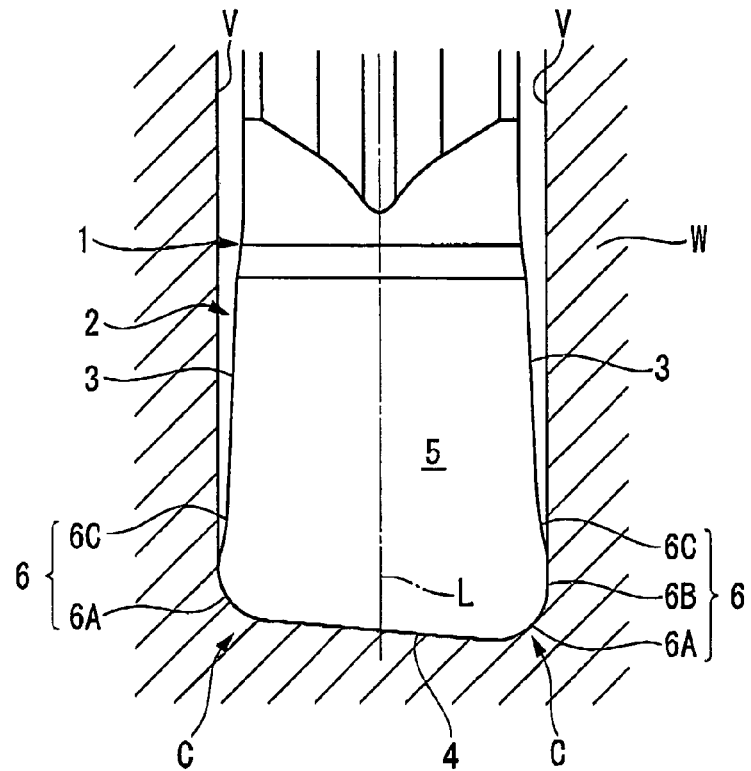
FIG. 21 is an enlarged plan view of the cutting edge part 2 when grooving or parting-off a workpiece W using the modified example.
Figure 22:
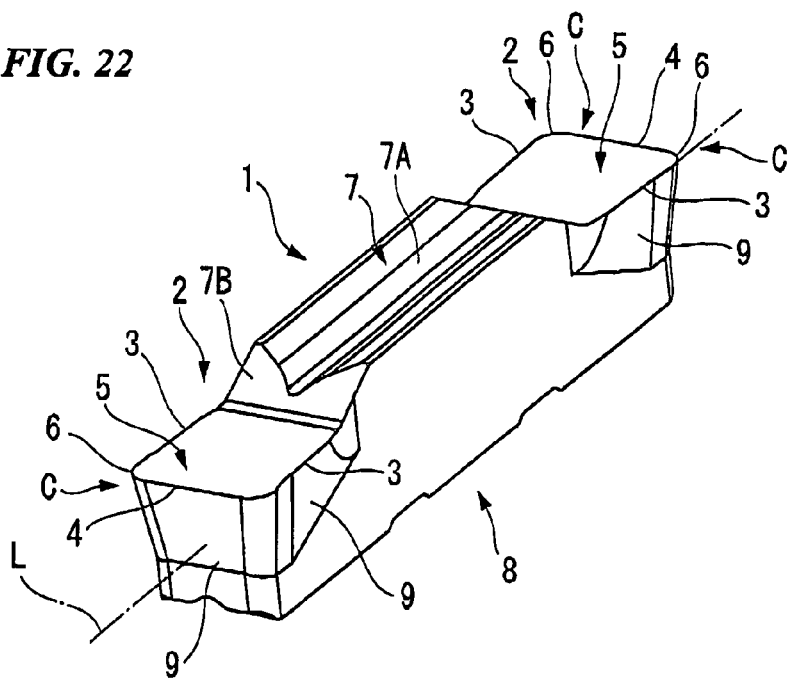
FIG. 22 is a perspective view showing a fourth embodiment of a cutting insert of the present invention.
Figure 23:
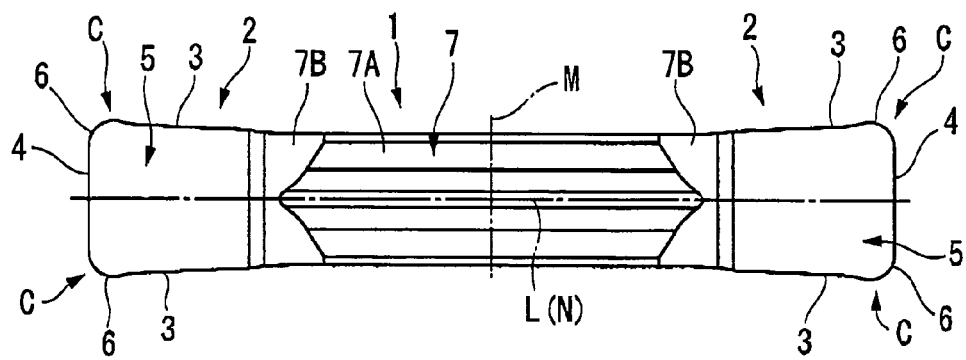
FIG. 23 is a plan view of the cutting insert viewed from a direction facing cutting faces 5, perpendicularly to the longitudinal direction.
Figure 24:
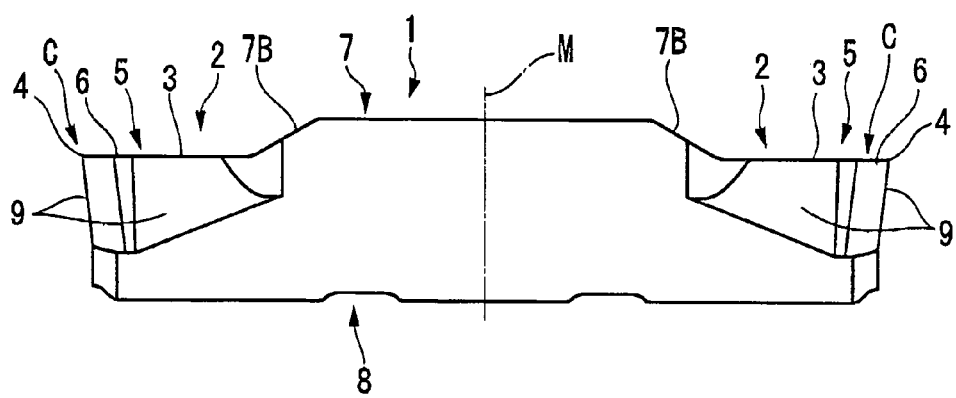
FIG. 24 is a side view of the cutting insert.
Figure 25:
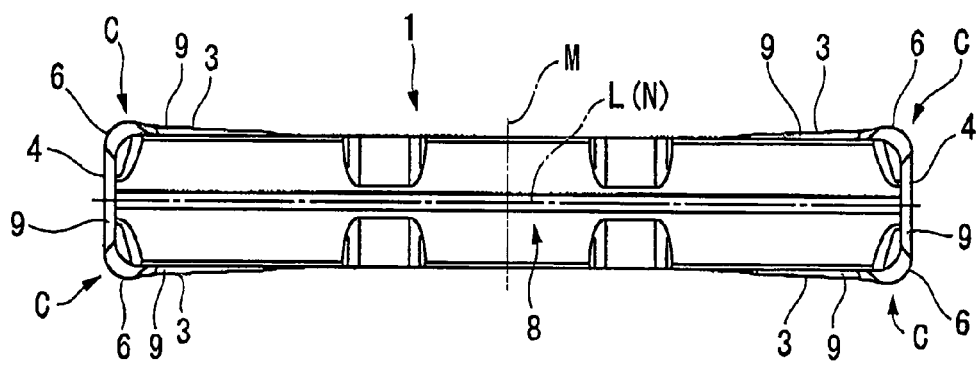
FIG. 25 is a bottom view of the cutting insert.
Figure 26:
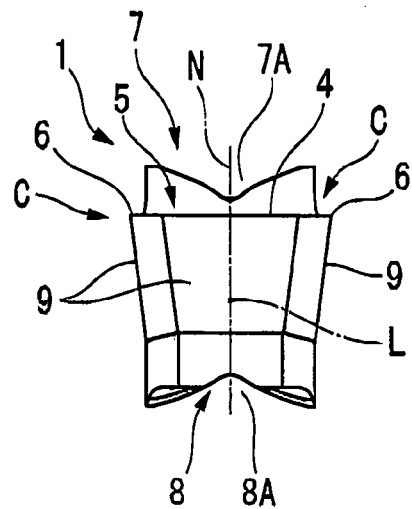
FIG. 26 is a front view of the cutting insert.

In the third embodiment, since a core is left on the machined surface V on the corner C side where the front cutting edge 4 recedes, which requires finish machining, as in a modified example of the third embodiment as shown in FIG. 19 to FIG. 21, a wiper edge 6B need not be formed on the corner edge 6 on the corner C side where the front cutting edge 4 recedes. Furthermore, a cutting insert according to the third embodiment and its modified example is a so-called handed insert, which has a right or left orientation of the cutting edge part 2. The insert body 1 is not formed symmetrically with respect to the planes M and N as in the first and the second embodiments and their modified examples, but is formed with 180° rotational symmetry about the intersecting ridge Y of the planes M and N as shown in FIG. 16 and FIG. 19.

Next, FIG. 22 to FIG. 28 show a fourth embodiment of the present invention. The fourth embodiment is characterized in that, similarly to the corner C on the side where the front cutting edge 4 recedes in the modified example of the third embodiment, no wiper edge 6B is formed in the corner edge 6. In other words, the fourth embodiment is applied to the corner C on the side where the front cutting edge 4 recedes in the modified example of the third embodiment. However, in the fourth embodiment, the front cutting edge 4 is a so-called non-handed insert, which is formed perpendicularly to the longitudinal direction (axis L direction) of the insert body 1 in the plan view similarly to the first and the second, embodiments and their modified examples, and does not have a right or left orientation of the cutting edge part 2.

Figure 27:
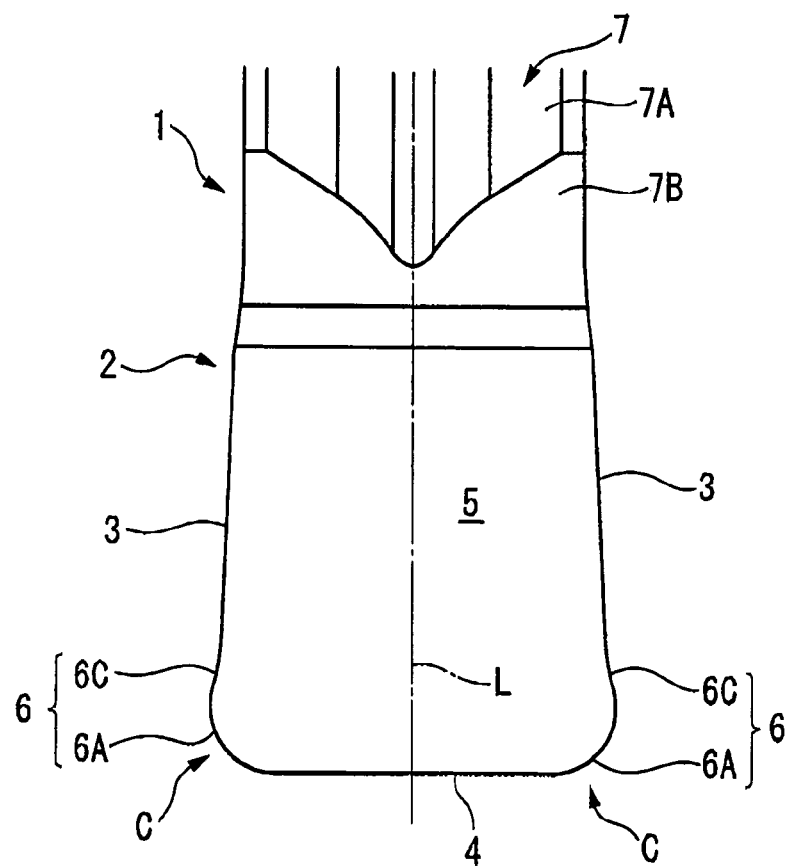
FIG. 27 is an enlarged plan view of the cutting edge part 2 of the cutting insert.
Figure 28:
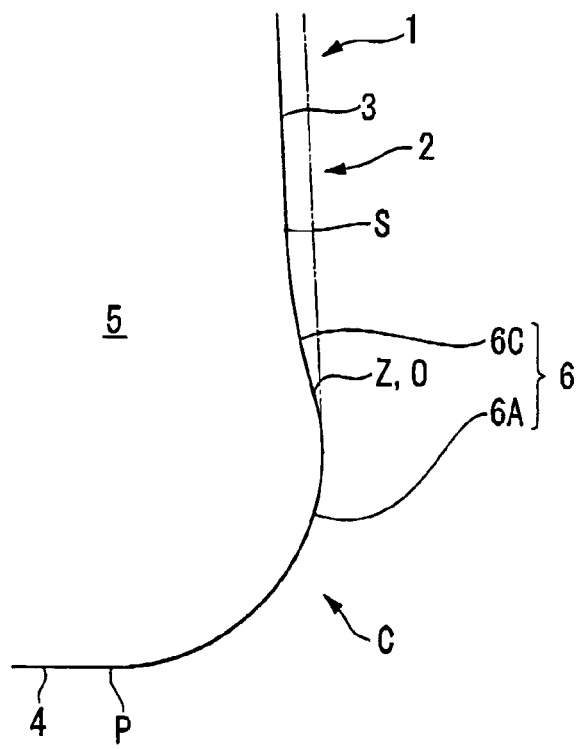
FIG. 28 shows the cutting insert, and is an enlarged plan view of a corner C at the bottom right side of FIG. 27.

That is, in the fourth embodiment, as shown in FIG. 27 and FIG. 28, the corner edge 6 comprises only a convex-curved line edge 6A with a convex arc or the like, which makes contact with the front cutting edge 4 at a point of contact P, and a concave-curved line edge 6C with a concave arc or the like, which makes contact with the convex-curved line edge 6A at a point of contact Z, and that makes contact with the side cutting edge 3 at a point of contact S in the above-described plan view. Accordingly, in the fourth embodiment, the convex edge 6A has a length of over one fourth of a circle, and goes around toward the rear end side and inner side in the widthwise direction beyond the point at which a tangent line that makes contact with the corner edge 6 is parallel to the longitudinal direction, and becomes the outermost point of the corner edge 6 in the widthwise direction. Moreover, as shown by a chain line in FIG. 28, it goes around beyond the point of contact with a tangent line that makes contact with the convex-curved line edge 6A and is parallel to the side cutting edge 3 in the plan view, and reaches the point of contact Z.

A tangent line that makes contact with the corner edge 6 rotates to the left from the point of contact P with the front cutting edge 4 to the point of contact Z in FIG. 28, and conversely, it rotates to the right from the point of contact Z to the point of contact S with the side cutting edge 3 in FIG. 28, so that the point of contact Z becomes a point of inflection O, and the direction of rotation of the tangent line changes continuously before and after it. Furthermore, in the fourth embodiment also, the corner edge 6 is formed in a convex shape that protrudes beyond the line extending to the distal end side of the side cutting edge 3.

Figure 29:
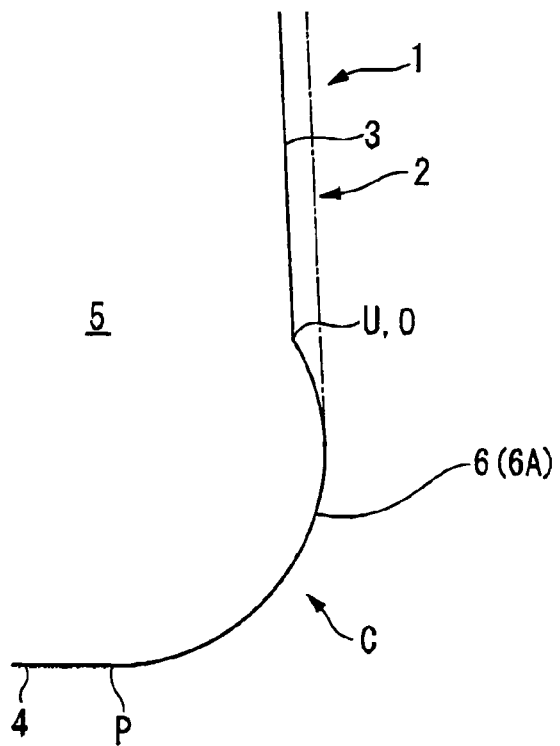
FIG. 29 shows a cutting insert of a fifth embodiment of the cutting insert of the present invention, corresponding to an enlarged plan view of the corner C at the bottom right side of FIG. 27.

On the other hand, in cases similar to the fourth embodiment, where no wiper edge 6B is formed on the corner edge 6, the arrangement may be similar to the second embodiment, where the corner edge 6 intersects before and after the point of inflection O at an angle, and is indented and angled at the point of inflection O. FIG. 29 shows a fifth embodiment of the present invention in such a case. That is, the corner edge 6 comprises only a convex-curved line edge 6A that makes contact with the front cutting edge 4 at a point of contact P in the plan view, goes around beyond the outermost point of the corner edge 6 in the widthwise direction and the point of contact of a tangent line to the corner edge 6 that is parallel to the side cutting edge 3, and intersects the side cutting edge 3 at an angle at a point of intersection U such that it is indented and angled.

In the fifth embodiment also, since a tangent line that makes contact with the corner edge 6 rotates to the left from the point of contact P to the point of intersection U in FIG. 29 as it approaches the side cutting edge 3 side, and rotates to the right to a direction along the side cutting edge 3 at the point of intersection, the point of intersection U becomes a point of inflection O similarly to the second embodiment. In the fifth embodiment, a region from the location where the convex-curved line edge 6A goes around beyond the outermost point or the point of contact of a tangent line to the corner edge 6 that is parallel to the side cutting edge 3 to reach the side cutting edge 3, may be joined in a straight line in the plan view similarly to the straight line edge 6E of the second embodiment.

Figure 30:
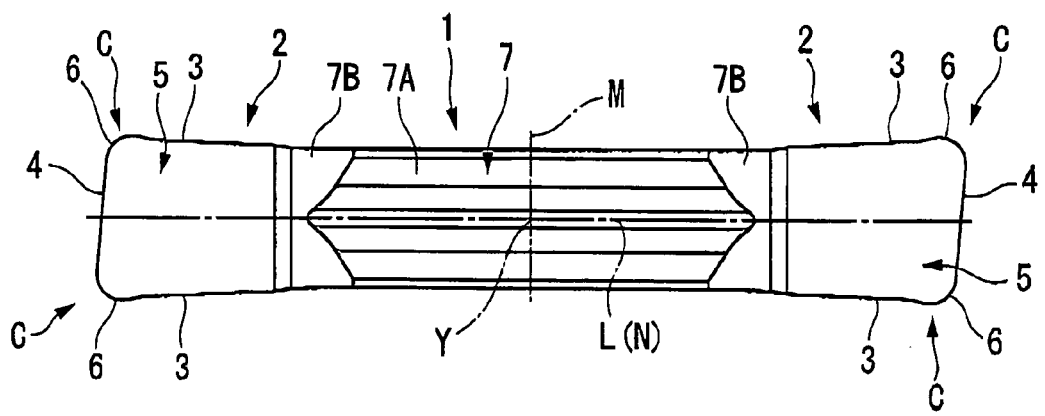
FIG. 30 is a diagram showing a sixth embodiment of the cutting insert of the present invention, and is a plan view from a direction facing cutting faces 5, perpendicular to the longitudinal direction.
Figure 31:
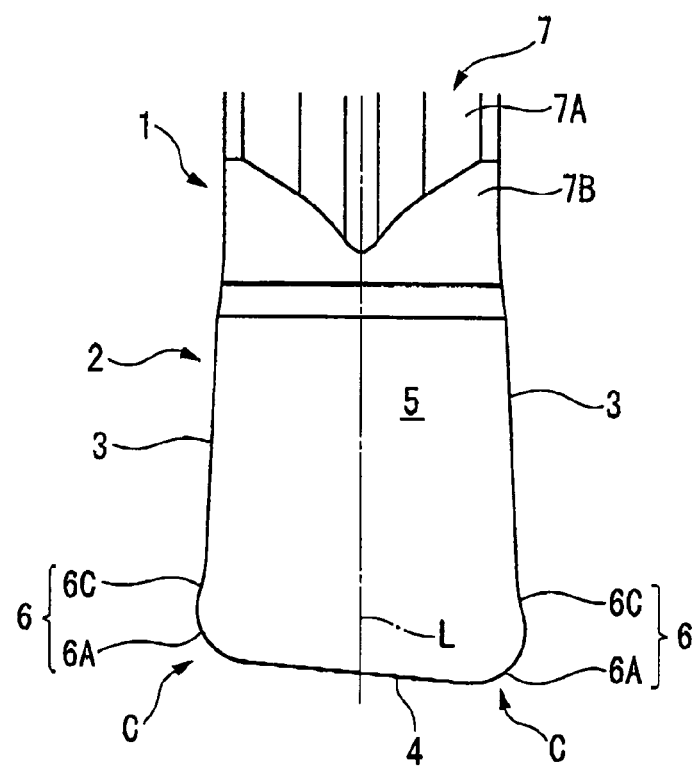
FIG. 31 is an enlarged plan view of the cutting edge part 2 of the cutting insert.
Figure 32A:
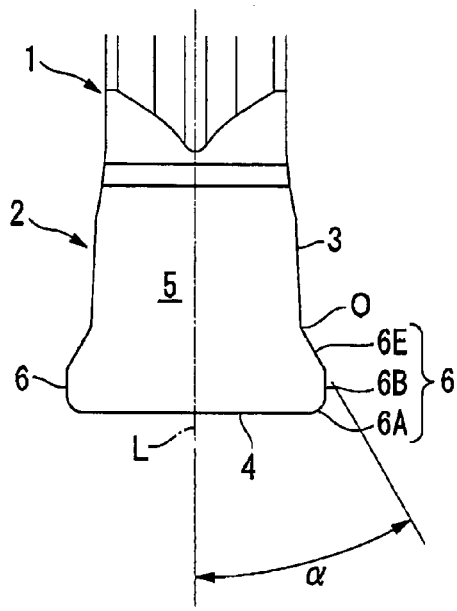
FIG. 32A is an enlarged plan view of the cutting edge part 2 of a fourth modified example of the second embodiment of the present invention.
Figure 32B:
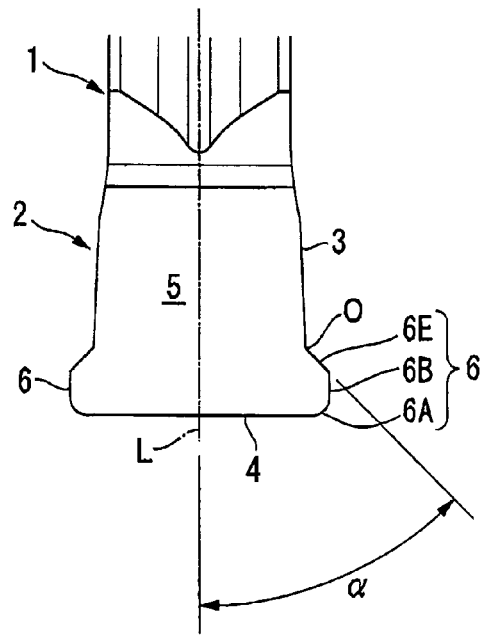
FIG. 32B is an enlarged plan view of the cutting edge part 2 of a fifth modified example of the second embodiment of the present invention.
Figure 32C:
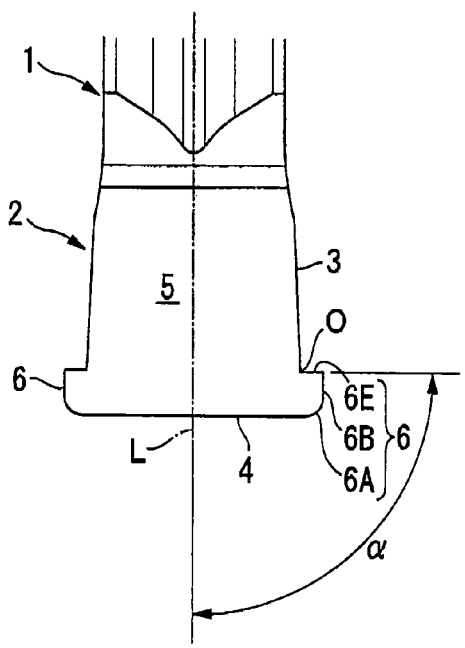
FIG. 32C is an enlarged plan view of the cutting edge part 2 of a sixth modified example of the second embodiment of the present invention.
Figure 32D:
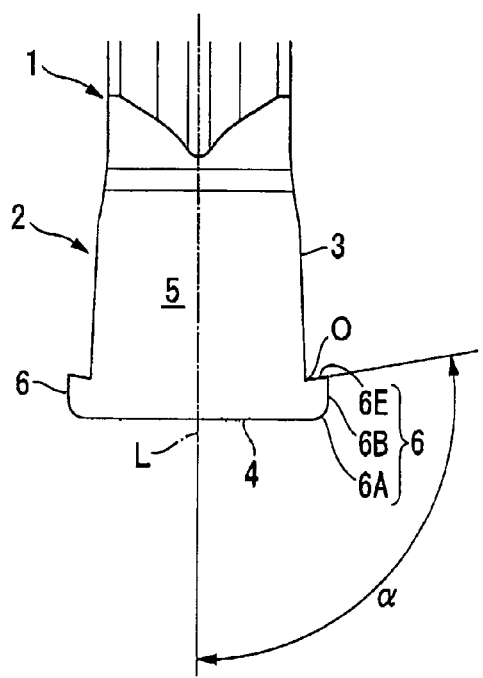
FIG. 32D is an enlarged plan view of the cutting edge part 2 of a seventh modified example of the second embodiment of the present invention.

Furthermore, even in the case where no wiper edge 6B is formed, as in the fourth and the fifth embodiments, the front cutting edge 4 may be formed such that it intersects diagonally with respect to the longitudinal direction (axis L direction) of the insert body 1 in the plan view as in the third embodiment, and may be made a handed cutting insert as mentioned previously. FIG. 30 and FIG. 31 show a sixth embodiment of the present invention in such a case.

Accordingly, in the fourth to the sixth embodiments also, the corner edge 6 has a point of inflection O at which the direction of rotation of a tangent line that makes contact with the corner edge 6 changes in the plan view, and is formed in a convex shape that protrudes in the widthwise direction from a line extending toward the distal end side, of the side cutting edge 3. Therefore, it is possible to ensure a large clearance between the machined surface of the workpiece W and the side cutting edge 3. Moreover, regarding the length of abrasion of the corner edge 6 in the longitudinal direction with respect to the amount of abrasion in the widthwise direction, there is a possibility that its rate of increase will be greater than in the first to the third embodiments. However, since it does not have a wiper edge 6B, its length can be kept short, so ultimately, it is possible to prevent an increase in cutting resistance.

Next FIG. 32A to FIG. 32D shown fourth to seventh modified examples of the second embodiment respectively. In these modified examples, in the corner edge 6 of the second embodiment, the length of the wiper edge 6B is fixed, and an incline angle α with respect to the axis B in the plan view, made by the straight line edge 6E inclined towards the inside of the cutting face 5 in the widthwise direction with approach to the side cutting edge 3 side, is changed. The cases are shown where in the fourth modified example shown in FIG. 32A, α=30°, in the fifth modified example shown in FIG. 32B, α=45°, in the sixth modified example shown in FIG. 32C, α=90°, and in the seventh modified example shown in FIG. 32D, α=100°.

As shown in these modified examples, if the incline angle α is small, the length along the longitudinal direction from the convex-curved line edge 6A of the corner edge 6 to the straight line edge 6E becomes long with approach towards the widthwise inside, and the length of the abrasion in the lengthwise direction accompanying the wear of the corner edge 6 is also increased. On the other hand, if the incline angle α becomes great, in particular is increased above 90°, the length in the longitudinal direction from the convex-curved line edge 6A to the straight line edge 6B becomes short with approach towards the widthwise inside, so that the strength of the insert body 1 in the corner edge 6 surroundings is impaired, with the possibility of failure occurring.

Consequently, it is preferable that the incline angle α in this case is within a range of 30 to 100°.

Figure 33A:
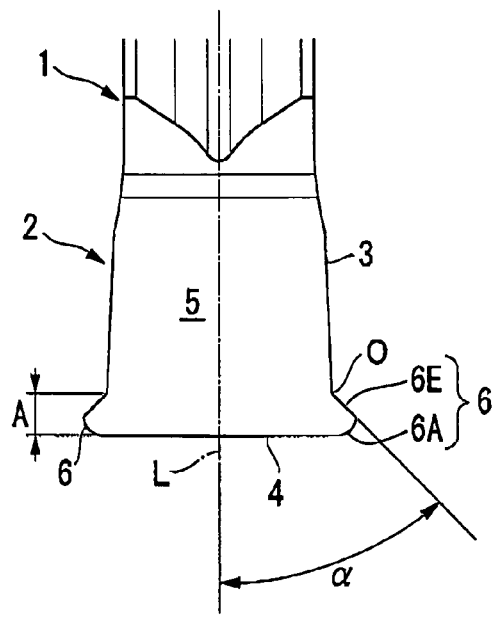
FIG. 33A is an enlarged plan view of the cutting edge part 2 of an eighth modified example of the second embodiment of the present invention.
Figure 33B:
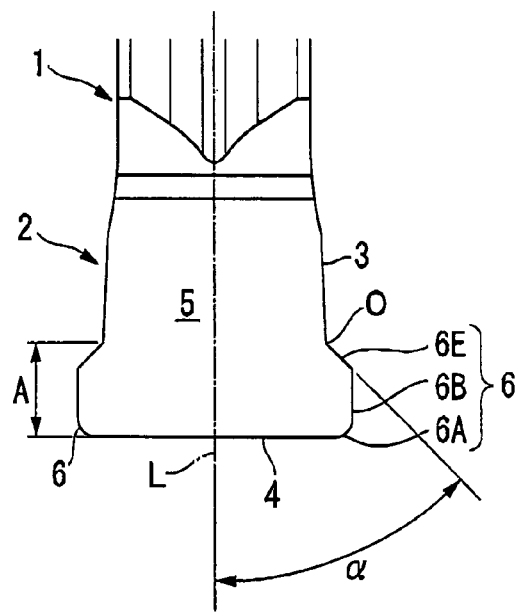
FIG. 33B is an enlarged plan view of the cutting edge part 2 of a ninth modified example of the second embodiment of the present invention.
Figure 34A:
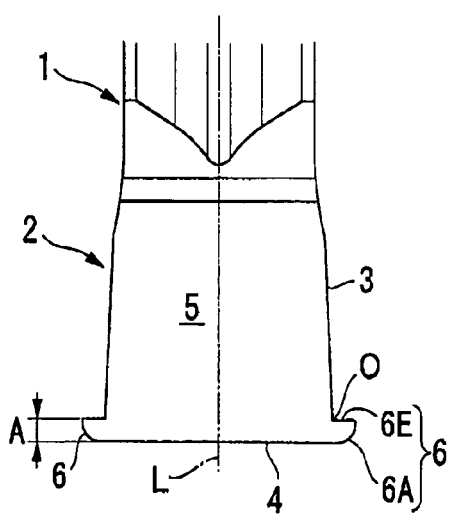
FIG. 34A is an enlarged plan view of the cutting edge part 2 of a tenth modified example of the second embodiment of the present invention.
Figure 34B:
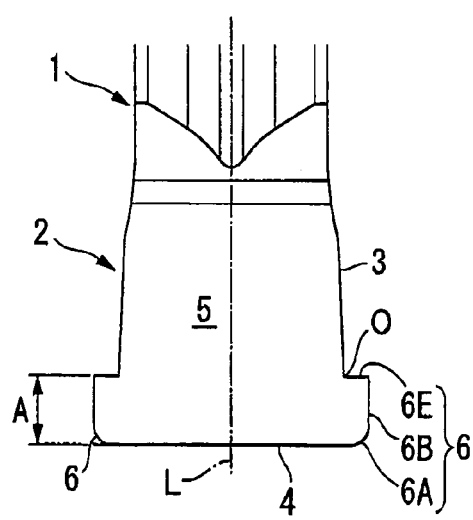
FIG. 34B is an enlarged plan view of the cutting edge part 2 of an eleventh modified example of the second embodiment of the present invention.

In this regard, FIG. 33A and FIG. 33B show eight and ninth modified examples where the distance A is changed, with the straight line edge 6E at an incline angle α=45° equal to the fifth modified example of the second embodiment. FIG. 34A and FIG. 34B show tenth and eleventh modified examples where the distance A is changed, with the straight line edge 6E at an incline angle α=90° equal to the sixth modified example of the second embodiment. In particular in the eight and tenth modified examples, the distance A is set so that the length of the wiper edge 6B becomes zero, that is, the convex-curved line edge 6A and the straight line edge 6E are connected directly at the point of intersection R.

In this manner, in the case where the corner edge 6 is provided with a straight line edge 6E inclined with respect to the longitudinal direction (the axis L direction), if the distance A becomes too small, then as shown in FIGS. 33A and 34A, the corner edge 6 itself becomes short, and in particular the portion that becomes the outermost point in the widthwise direction becomes sharp, so that chipping is likely to occur. On the other hand, if this distance A becomes too large, then even in the case where, as shown for example in FIG. 34B, the increase in the length of the abrasion in the lengthwise direction is small with respect to the widthwise amount of the abrasion of the corner edge 6, the absolute contact length between the corner edge 6 and the workpiece becomes long, and hence eventually this results in an increase in the cutting resistance. Therefore, preferably the distance A is made within a range of 10 to 60% with respect to the maximum width B of the cutting face 5.

Furthermore, FIG. 35A to FIG. 35D show first to fourth modified examples of the fifth embodiment in which the wiper edge 6B is not formed on the cutting face 5, and the convex-curved line edge 6A goes around, as it is, past a contact point of the tangent to the corner edge 6 that is parallel with the widthwise outermost point or the side cutting edge 3 of the corner edge 6. In these modified examples, the radii of the convex-curved line edges 6A serving as the boundary of the widthwise outermost point of the corner edges 6 are different. That is to say, in the first to third modified examples shown in FIG. 35A to FIG. 35C, the distal end side from the outermost point has a larger radius than the rear end side, and in the fourth modified example shown in FIG. 35D, converse to this, the rear end side from the outermost point has a larger radius than the distal end side.

Figure 35A:
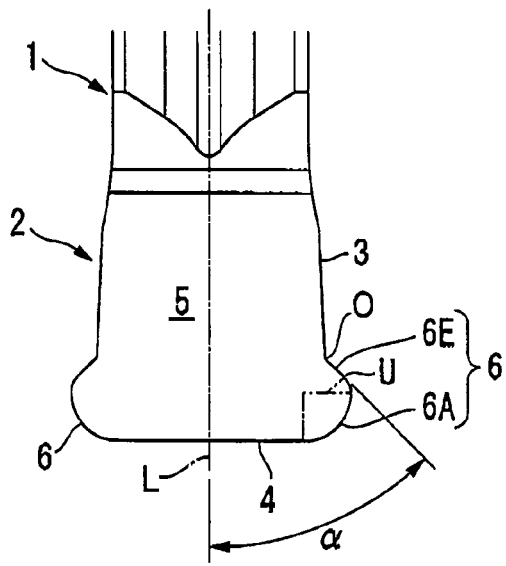
FIG. 35A is an enlarged plan view of the cutting edge part 2 of a first modified example of the fifth embodiment of the present invention.
Figure 35B:
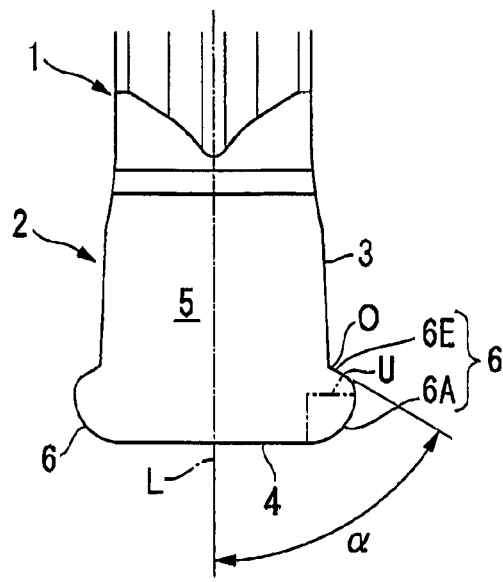
FIG. 35B is an enlarged plan view of the cutting edge part 2 of a second modified example of the fifth embodiment of the present invention.
Figure 35C:
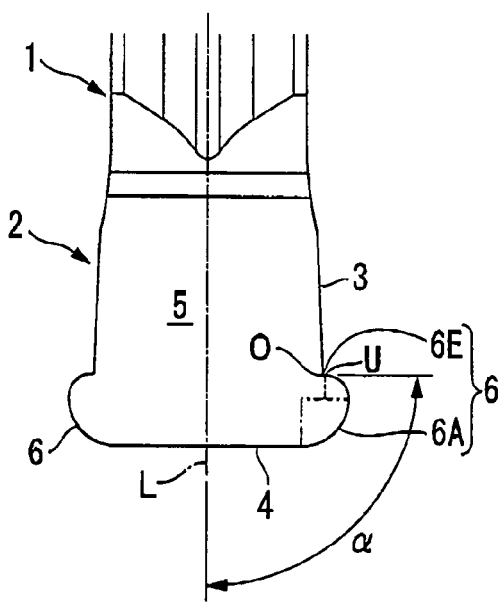
FIG. 35C is an enlarged plan view of the cutting edge part 2 of a third modified example of the fifth embodiment of the present invention.
Figure 35D:
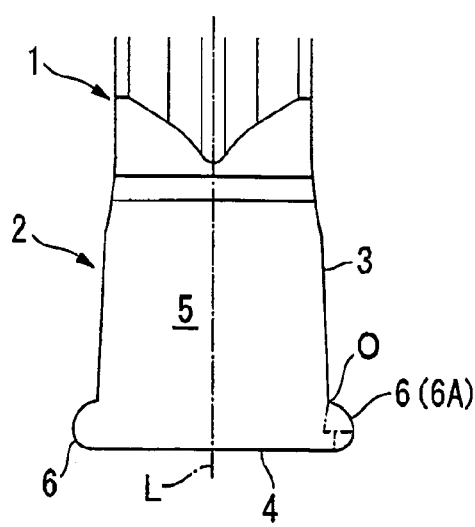
FIG. 35D is an enlarged plan view of the cutting edge part 2 of a fourth modified example of the fifth embodiment of the present invention.
Figure 36A:
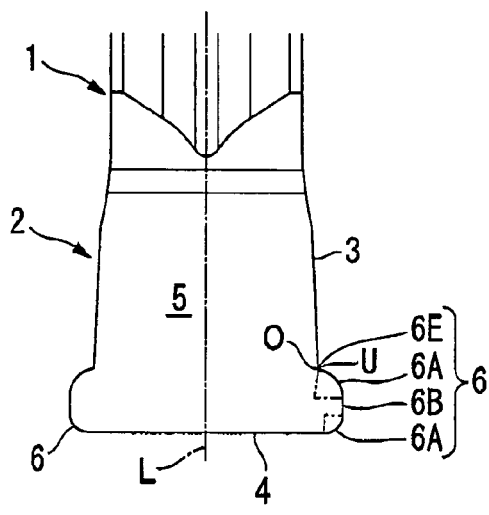
FIG. 36A is an enlarged plan view of the cutting edge part 2 of a fifth modified example of the fifth embodiment of the present invention.
Figure 36B:
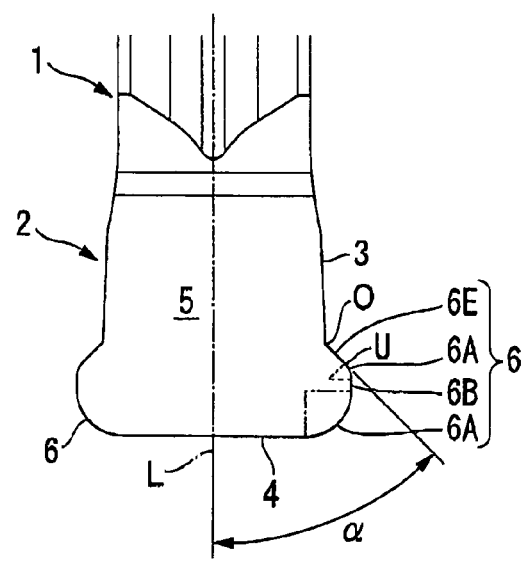
FIG. 36B is an enlarged plan view of the cutting edge part 2 of a sixth modified example of the fifth embodiment of the present invention.

Furthermore, in the first to third modified examples shown in FIG. 35A to FIG. 35C, between the convex-curved line edge 6A that goes around in this way, and the side cutting edge 3, is formed a straight line edge 6E that contacts with the convex-curved line edge 6A at contact point U, and is indented with an angle in the point of inflection O with the side cutting edges 3. An inclination angle α with respect to the axis L is set to 45° in the first modified example, to 60° in the second modified example, and to 90° in the third modified example. Moreover, the fifth and sixth modified examples shown in FIG. 36A and FIG. 36B, are further modified examples of the fourth and second modified examples, being examples where a wiper edge 6B parallel with the axis L is formed on the outermost point of the convex-curved line edge 6A. A modified example is also possible, where the radius of the joining edge 6D in the third modified example of the second embodiment, is made small.

Figure 37A:
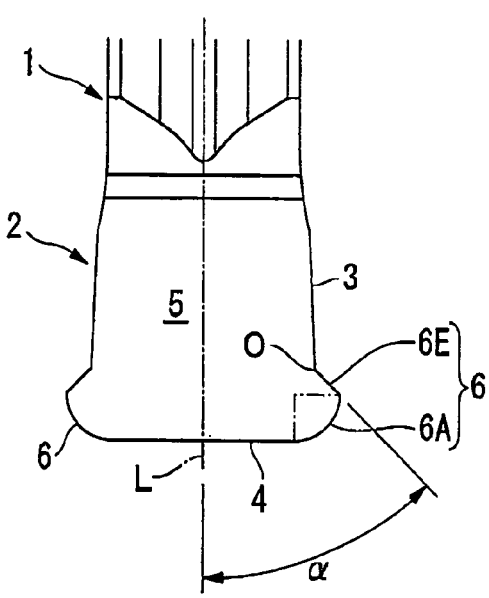
FIG. 37A is an enlarged plan view of the cutting edge part 2 of a seventh embodiment of the present invention.

Furthermore, FIG. 37A shows a cutting insert of a seventh embodiment of the present invention which is a further modified example of the modified example shown in FIG. 33A. The convex-curved line edge 6A is a ¼ arc with a radius greater than in the modified example shown in FIG. 33A. To the convex-curved line edge 6A is directly connected a straight line edge 6E of an incline angle α=45°, so that a wiper edge 6B is not formed.

Figure 37B:
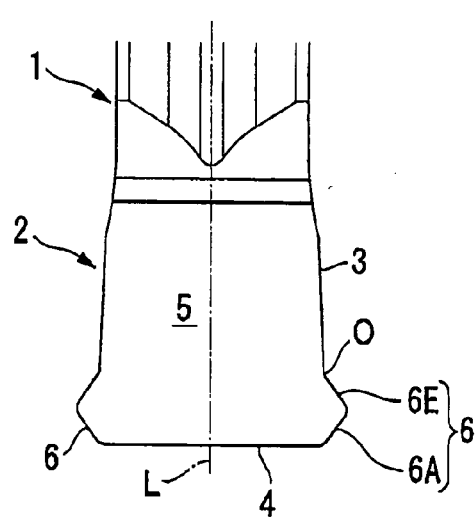
FIG. 37B is an enlarged plan view of the cutting edge part 2 of a modified example of the seventh embodiment of the present invention.

In the first to the seventh embodiments and their modified examples, corner edges 6 that have the abovementioned point of inflection O are formed on each of the pair of corners C of the cutting edge part 2. However, regarding such a corner edge 6, it is acceptable for only one of the pair of corner edges formed in the corners C to be thus, and the other corner edge may be formed in a convex-curved line shape edge such as a convex arc or the like that makes contact with the side cutting edge 1 and the front cutting edge 4. Moreover, the region from where a tangent line of the corner edge 6, which makes contact with the corner edge 6 from the front cutting edge 4, faces the longitudinal direction, to immediately before it reaches the outermost point in the widthwise direction, as shown in the modified example of the seventh embodiment shown in FIG. 37B, may be formed as a chamfered edge 6F in a straight line, which extends in a direction that intersects the axis L diagonally such that it faces the outside in the widthwise direction as it approaches the rear end side of the cutting edge part 2 in the plan view.

In the first to the seventh embodiments and their modified examples, the corner edge 6 has only one point of inflection O as mentioned above after a tangent line, which makes contact with the corner edge 6 from the front cutting edge 4 toward the side cutting edge 3 side, faces the longitudinal direction (that is, the region at the rear end side of the cutting edge part 2 beyond the outermost point of the corner edge 6 in the widthwise direction). However, a plurality of points of inflection may be provided, for example by forming minute convex parts or stepped parts in the corner edge 6 at locations that do not affect the clearance. Moreover, the side cutting edge 6 may be one that extends parallel to the axis L in the plan view, or one formed in a concave-curved line shape, in addition to one with a straight line shape, to which a back taper in the plan view is applied, as mentioned above.

Furthermore, in the cutting insert of the present invention, in order to ensure a clearance between the machined surface V of the workpiece W and the side cutting edge 3 as described above, then when feeding the insert body 1 in the lengthwise direction to perform the grooving and parting process, the side cutting edge does not take part in cutting. Consequently the portion of the side cutting edge 3 does not perform a cutting action, and can be simply the edge ridge portion of the cutting face 5. That is, the cutting insert of the respective embodiments and their modified examples, may be one where the cutting edge part 2 having the cutting face 5, which is provided with the front cutting edge 4 that extends in the direction that intersects the longitudinal direction (axis L direction) of the insert body 1, is formed on the end of the bar shaped insert body 1, and in plan view, a corner edge 6 positioned on at least one end of the two ends of the front cutting edge 4, is formed in a convex shape such that it has a point of inflection O at which, after a tangent line that makes contact with the corner edge 6 rotates in a direction extending in the longitudinal direction along the corner edge 6 from the front cutting edge 4, its direction of rotation changes.

Incidentally, in the cutting inserts of these first to seventh embodiments and their modified examples, by forming the corner edge 6 in this way in a convex shape having the point of inflection O in plan view, the other side to the front cutting edge 4, that is connected with this point of inflection, that is to say, the cutting part where the rear end side of cutting edge part 2 reaches to the edge ridge portion of the side cutting edges 3 or the cutting face 5 while being curved concave towards the rear end side, is formed on the corner edge 6. This cutting part, for example is the concave-curved line edge 6C in the first, third, fourth, and sixth embodiments and their modified examples, or is the straight line edge 6E in the second and seventh embodiments and their modified examples, or is the convex-curved line edge 6A and the straight line edge 6E connected thereto, of the part that is directed to go around the rear end side of cutting edge part 2 from the widthwise outermost point of the corner edge 6, in the fifth embodiment and its modified example.

Consequently, according to the cutting insert of these embodiments and their modified examples, after the insert body 1 is fed in the longitudinal direction with respect to the workpiece W to cut the machined surface V with the part on the front cutting edge 4 side, of the front cutting edge 4 or the corner edge 6, then when continuing on from this the insert body 1 is retracted in the longitudinal direction, the machined surface V can be further cut using the cutting part. Next, taking the cutting insert of the fifth modified example of the fifth embodiment shown in FIG. 6A as an example, a description is given of an embodiment of a cutting method of the present invention.

Figure 38A:
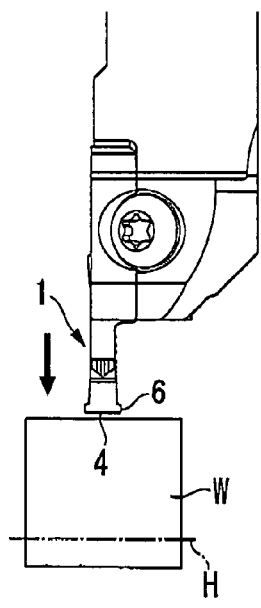
FIG. 38A is a drawing for explaining a first embodiment of a cutting method of the present invention.
Figure 38B:
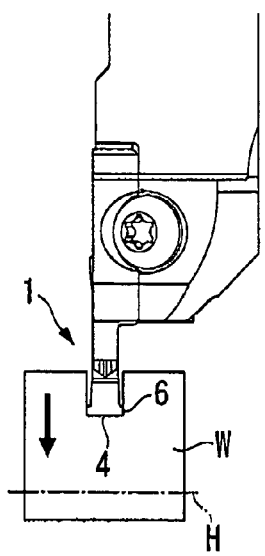
FIG. 38B is a drawing for explaining the first embodiment of a cutting method of the present invention.
Figure 38C:
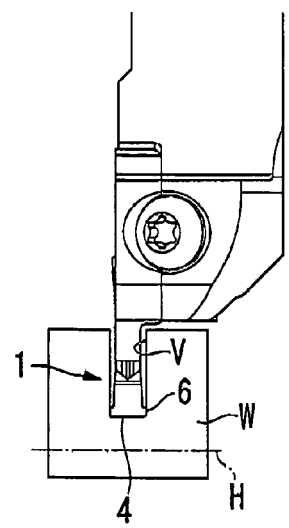
FIG. 38C is a drawing for explaining the first embodiment of a cutting method of the present invention.
Figure 38D:
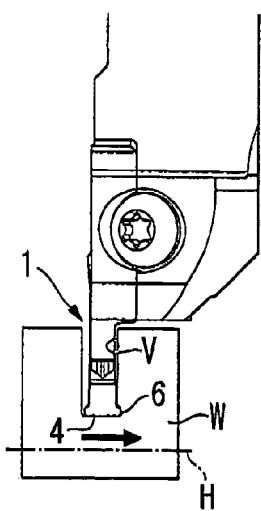
FIG. 38D is a drawing for explaining the first embodiment of a cutting method of the present invention.
Figure 38E:
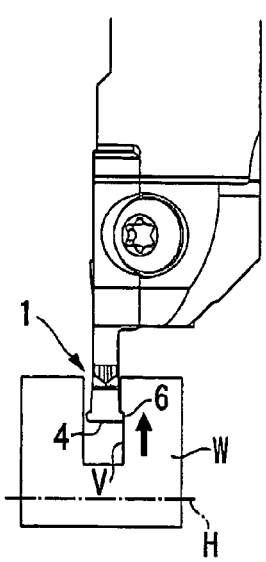
FIG. 38E is a drawing for explaining the first embodiment of a cutting method of the present invention.
Figure 38F:
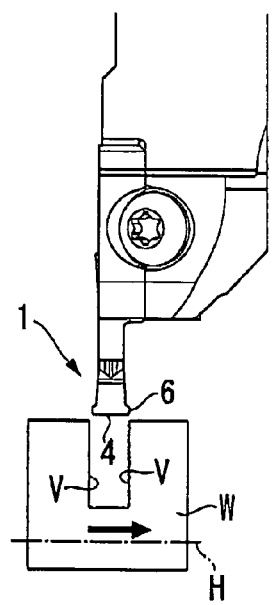
FIG. 38F is a drawing for explaining the first embodiment of a cutting method of the present invention.

FIG. 38A though FIG. 38F describe a first embodiment of the cutting method of the present invention. As shown by the arrows in FIG. 38A to FIG. 38C, the insert body 1 is fed in the longitudinal direction to the outer peripheral face of the workpiece W that rotates about the axis H, to perform a grooving process by the front cutting edge 4 and the portion of the corner edge 6 that faces the front cutting edge 4 side. Then, as shown by the arrow in FIG. 38D, the insert body 1 is moved within the range of the protrusion amount G for example, to one wall side (the right side machined surface V in FIG. 38D) of the formed groove, so that the cutting edge 6 cuts in. Then, as shown by the arrows in FIG. 38E and FIG. 38F, the insert body 1 is withdrawn in the longitudinal direction as it is, and the cutting part of the corner edge 6 that faces the opposite side to the front cutting edge 4, forms a groove of a wider width than the maximum width B of the cutting face 5.

Regarding this point, in the cutting insert described in Patent Documents 1 to 4, the corner edge is curved from the front face cutting edge in a convex curve and touches or intersects the side cutting edge as it is, without the point of inflection. Therefore, even if the insert body is shifted to one groove wall side, and cutting is performed while retracting, cutting resistance is great. As a result the insert body is deflected so that groove width cannot be expanded, and a process with two reciprocations where the insert body is once drawn out straight from the groove and shifted, and is again fed in the longitudinal direction so that the groove width is widened, must be performed. However according to the cutting method of the first embodiment that uses the cutting insert of the present invention, the above wide groove can be formed by one reciprocation of the insert body 1. Consequently, according to the first embodiment, a process where the insert body 1 does not participate in cutting during movement does not occur, so that it is possible to improve the cutting efficiency.

Furthermore, FIG. 39A to FIG. 39F shown a second embodiment of a cutting method of the present invention, for describing a case where an inner face of a wide groove formed beforehand in the workpiece W is finish processed. That is to say, in the second embodiment, as shown by the arrows in FIG. 39A and FIG. 39B, the insert body 1 is fed in the longitudinal direction along one of the wall surfaces (the machined surface V on the right side in the figures of FIG. 39A to FIG. 39F) of a groove formed in a workpiece W that is rotated about an axis H, to thereby finish cut the side face by the corner edge 6 on one side face side. Next, once the bottom face of the groove has been reached, the insert body 1 is moved to the other wall surface side (the machined surface V on the left side in the figures of FIG. 39A to FIG. 39F) of the groove as shown by the arrow in FIG. 39C while the front cutting edge 4 is cutting into the bottom face, and the bottom face is finish cut by the corner edge 6 that faces the other wall side and by the front cutting edge 4.

Figure 39A:
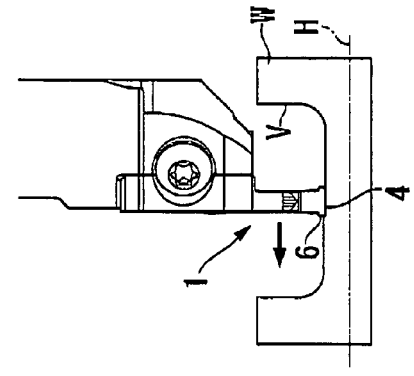
FIG. 39A is a drawing for explaining a second embodiment of a cutting method of the present invention.
Figure 39B:
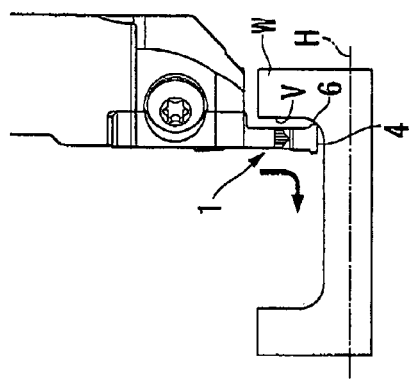
FIG. 39B is a drawing for explaining the second embodiment of a cutting method of the present invention.
Figure 39C:
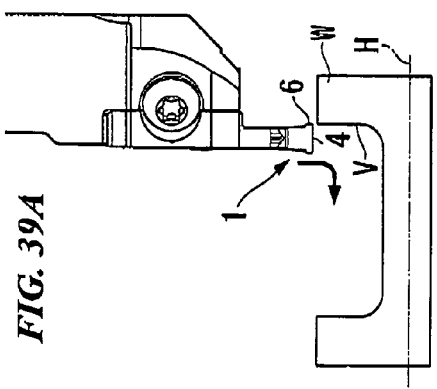
FIG. 39C is a drawing for explaining the second embodiment of a cutting method of the present invention.
Figure 39D:
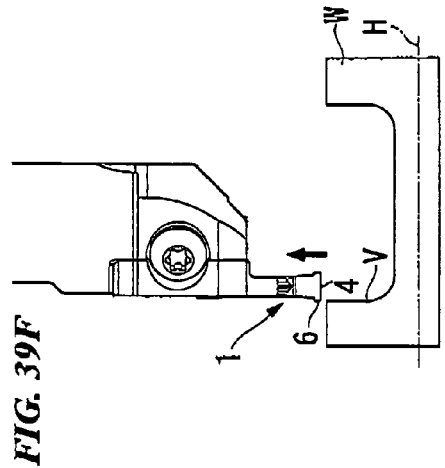
FIG. 39D is a drawing for explaining the second embodiment of a cutting method of the present invention.
Figure 39E:
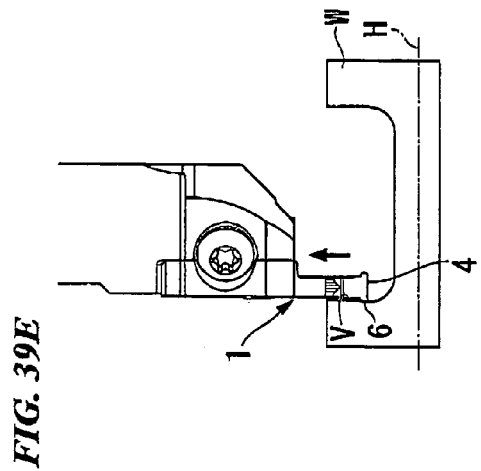
FIG. 39E is a drawing for explaining the second embodiment of a cutting method of the present invention.
Figure 39F:
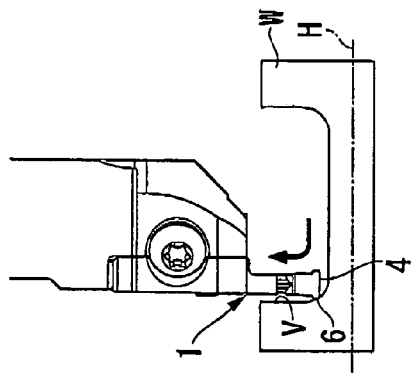
FIG. 39F is a drawing for explaining the second embodiment of a cutting method of the present invention.

Then, once the corner edge 6 has reached to the other wall surface as shown in FIG. 39D, the front cutting edge 4 of the corner edge 6 faces the other side, and while the cutting part cuts into the other wall surface, the insert body 1 is moved back in the longitudinal direction as shown by the arrow in FIG. 39E, and is withdrawn from the groove as shown in FIG. 39F. As a result all of the inner face of the groove can be finish cut by just one movement of the insert body 1.

Regarding this point also, in the aforementioned cutting inserts disclosed in Patent Documents 1 to 4, similar to the case of the first embodiment, the finishing of the other wall surface cannot be performed while retracting the insert body. Therefore the insert body must be retracted once partway through finish cutting the bottom face of the groove, and then the insert body must be then fed along the other wall surface so that the whole of the inside of the groove can be finish cut. This processing where partway through, cutting is not performed while retracting the insert body cannot be avoided. However, according to the second embodiment, by avoiding this situation where a processing step intervenes, it is possible to achieve efficient finish cutting.

Moreover, if in this way the finish cutting is divided into two processes part way through the cutting of the bottom face of the groove, a step or a stripe is produced in the joint of the initial and final finishing processed surfaces of the groove bottom, thus impairing the accuracy and quality of the machined surface. However in the second embodiment, since the finish cutting of the bottom face is finished in one movement of the insert body, such a step or stripe is not left. Consequently, according to the second embodiment, it is also possible to improve the machining accuracy and machining quality in this finish cutting. Moreover, as a cutting insert that performs such a grooving process, there is also known a cutting insert in which the cutting face is formed in a round shape. However with this insert, if the feed is great, stripes will occur in the machined surface. Therefore it is not possible to have both an improvement in machining efficiency and an improvement in machining accuracy and quality, as in the second embodiment.

In the cutting method of these first and second embodiments, the description has been for where a grooving process is performed on the workpiece W. However also for example where a parting process is performed to cut off the workpiece, it is also possible to feed the insert body 1 in the longitudinal direction until it reaches the axis of rotation of the workpiece to cut the workpiece, and then shift the insert body 1 to the cut surface side of the workpiece so that the corner edge 6 on the cut surface side cuts in, and in this state retract the insert body 1 in the longitudinal direction, to thereby perform finish cutting of the cut section continuously.

INDUSTRIAL APPLICABILITY

According to the present invention, a cutting insert can be provided in which a drastic increase in cutting resistance due to wear of the corner edge is suppressed, so that the insert life can be extended, and also the clearance between the side cutting edge or the region where the corner edge reaches the side cutting edge, and the machined surface is ensured, so that it is possible to improve machining accuracy and machining quality. Furthermore, according to the present invention, it is also possible to provide a cutting method capable of forming a machined surface with high machining accuracy and machining quality, without impairing machining efficiency.

The invention claimed is:
1. A cutting insert, wherein:
a cutting edge part having a quadrangular shaped cutting face, which is provided with a pair of side cutting edges extending in a longitudinal direction of an insert body, and a front cutting edge between ends of the side cutting edges that extends in a direction that intersects the longitudinal direction, is formed at an end of the insert body having a bar-shape; and
viewed from a direction facing the cutting face perpendicularly to the longitudinal direction, at least one of a pair of corner edges where the side cutting edge and the front cutting edge intersect is formed in a convex shape such that it has a point of inflection at which, after a tangent line that makes contact with the corner edge rotates in a direction extending in the longitudinal direction along the corner edge from the front cutting edge, its direction of rotation changes, and it joins the side cutting edge, characterized in that
the corner edge comprises, in order, from the front cutting edge towards the side cutting edges at each of the corners:
a convex-curved line edge with a convex arc shape of approximately one fourth of a circle that merges smoothly with the front cutting edge;
a wiper edge that merges with the convex-curved line edge and extends in a straight line in the longitudinal direction; and
a straight line edge that is angled such that it is indented toward the inside of the cutting face in the widthwise direction of the insert main body as it approaches the side cutting edge,
wherein the incline angle α of the straight line edge with respect to the axis of the insert body is in a range of 30° to 90°.

2. The cutting insert according to claim 1, wherein:
viewed from the direction facing the cutting face perpendicularly to the longitudinal direction, the side cutting edge extends toward a distal end side in a straight line; and
at least one of the pair of corner edges is formed in a convex shape that protrudes beyond a line extending toward the distal end side of the side cutting edge.

3. The cutting insert according to claim 1, wherein
viewed from the direction facing the cutting face perpendicularly to the longitudinal direction, at least one of the pair of corner edges is indented and angled at the point of inflection.

4. The cutting insert according to claim 1, wherein
viewed from the direction facing the cutting face perpendicularly to the longitudinal direction, at least one of the pair of corner edges has a wiper edge that extends in the longitudinal direction.

5. The cutting insert according to claim 1, wherein
viewed from the direction facing the cutting face perpendicularly to the longitudinal direction, the front cutting edge extends in a direction whereby it intersects the longitudinal direction diagonally.

6. The cutting insert according to claim 1, wherein
viewed from the direction facing the cutting face perpendicularly to the longitudinal direction, a distance from an outermost point in the longitudinal direction of the front cutting edge to the point of inflexion is within a range of 10 to 60% with respect to a maximum width in a direction perpendicular to the longitudinal direction of the cutting face.

7. A cutting method using a cutting insert having a construction according to claim 1,
when the insert body that is fed in the longitudinal direction with respect to a workpiece is retracted in the longitudinal direction, a machined surface of the workpiece is cut by a cutting edge facing an opposite side to the front cutting edge side that is continuous with the point of inflection, of the corner edges.

\* \* \* \* \*